(12) United States Patent
Khan

(10) Patent No.: US 11,437,199 B1
(45) Date of Patent: Sep. 6, 2022

(54) LAYERED DUAL HYDROXIDE (LDH) COMPOSITE

(71) Applicant: KING FAHD UNIVERSITY OF PETROLEUM AND MINERALS, Dhahran (SA)

(72) Inventor: Firoz Khan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/716,358

(22) Filed: Apr. 8, 2022

(51) Int. Cl.
*H01G 11/38* (2013.01)
*H01G 11/26* (2013.01)

(52) U.S. Cl.
CPC ............. *H01G 11/38* (2013.01); *H01G 11/26* (2013.01)

(58) Field of Classification Search
CPC ......... H01G 11/38; H01G 11/26; H01G 11/36
See application file for complete search history.

(56) References Cited

U.S. PATENT DOCUMENTS

| 10,938,032 B1 | 3/2021 | El-Kady et al. |
| 2009/0290287 A1* | 11/2009 | Lipka .................... H01G 11/46 361/502 |

FOREIGN PATENT DOCUMENTS

| CN | 106517162 A | * | 3/2017 | .......... H01M 10/052 |
| CN | 107086131 A | | 8/2017 | |
| CN | 112117453 A | | 12/2020 | |
| CN | 112229885 A | * | 1/2021 | |
| CN | 111155146 B | | 3/2021 | |
| CN | 109778225 B | | 8/2021 | |

OTHER PUBLICATIONS

Hao Chen et al., Nickel-Cobalt Layered Double Hydroxide Nanosheets for High-performance Supercapacitor Electrode Materials, Sep. 23, 2013, Advanced Functional Materials, vol. 24, Issue 7, pp. 934-942, https://doi.org/10.1002/adfm.201301747 (Year: 2013).*
Yujuan Chen et al., Synthesis of nitrogen/sulfur co-doped reduced graphene oxide aerogels for high-performance supercapacitors with ionic liquid electrolyte, Dec. 1, 2019, Materials Chemistry and Physics. vol. 238 (2019) 121932, https://doi.org/10.1016/j.matchemphys.2019.121932 (Year: 2019).*
Kai Le et al., Sandwich-like NiCo layered double hydroxide/reduced graphene oxide nanocomposite cathodes for high energy density asymmetric supercapacitors, 2019, Dalton Trans., 48, 5193-5202, https://doi.org/10.1039/C9DT00615J (Year: 2019).*
Wencong Wang et al., Synthesis of 3D hierarchical porous Ni—Co layered double hydroxide/N-doped reduced graphene oxide composites for supercapacitor electrodes, 2019, Inorg. Chem. Front., 6, 407-416, https://doi.org/10.1039/C8QI01132J (Year: 2019).*

(Continued)

*Primary Examiner* — David M Sinclair
(74) *Attorney, Agent, or Firm* — Oblon, McClelland, Maier & Neustadt, L.L.P.

(57) ABSTRACT

A layered dual hydroxide (LDH) composite is provided. The LDH composite includes a nickel (Ni)-cobalt (Co)-LDH, and a nitrogen (N) and sulfur (S) co-doped reduced graphene oxide (rGO-NS), where the Ni—Co-LDH is at least partially enfolded by the rGO-NS to form the LDH composite. An electrode including the LDH composite is also provided.

14 Claims, 19 Drawing Sheets

(56) References Cited

OTHER PUBLICATIONS

Liu, L., Liu, A., Xu, Y et al. Agglomerated nickel-cobalt layered double hydroxide nanosheets on reduced graphene oxide clusters as efficient asymmetric supercapacitor electrodes, 2020, Journal of Materials Research 35, 1205-1213, https://doi.org/10.1557/jmr.2020.39 (Year: 2020).*

Liuyang Zhang et al., Synthesis of reduced graphene oxide supported nickel-cobalt-layered double hydroxide nanosheets for supercapacitors, Nov. 19, 2020, Journal of Colloid and Interface Science, vol. 588, pp. 637-645, https://doi.org/10.1016/j.jcis.2020.11.056 (Year: 2020).*

Lu Liu, et al., "Agglomerated nickel-cobalt layered double hydroxide nanosheets on reduced graphene oxide clusters as efficient asymmetric supercapacitor electrodes", Journal of Materials Research, vol. 35, Issue 9, May 1, 2020, pp. 1205-1213 (Abstract only).

Haoquan Li, et al., "NICo$_2$S$_4$ microspheres grown on N, S co-doped reduced graphene oxide as an efficient bifunctional electrocatalyst for overall water splitting in alkaline and neutral pH", Nano Research, vol. 15, Jul. 9, 2021, pp. 950-958 (Abstract only).

Hamed Kowsari, et al., "Nitrogen and sulfur doped ZnAl layered double hydroxide/reduced graphene oxide as an efficient nanoelectrocatalyst for oxygen reduction reactions", International Journal of Hydrogen Energy, vol. 45, Issue 51, Aug. 11, 2020, pp. 27129-27144 (Abstract only).

* cited by examiner

LAYERED DUAL HYDROXIDE (LDH) COMPOSITE

STATEMENT OF PRIOR DISCLOSURE BY THE INVENTOR

Aspects of the present disclosure are described in F. Khan; "N and S co-doped graphene enfolded Ni—Co-layered double hydroxides: an excellent electrode material for high-performance energy storage devices"; Oct. 18, 2021; RSC Adv., 2021, 11, 33895, incorporated herein by reference in its entirety.

BACKGROUND

Technical Field

The present disclosure is directed to an inorganic composite, and particularly to a layered dual hydroxide (LDH) composite, and an electrode thereof.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Electronic devices such as power tools, smartphones, grid stabilization devices, electric vehicles, and laptops may rely on energy storage devices for portability and rechargeability. Energy storage devices address issues such as environmental protection, renewable energy integration, energy sustainability, and energy efficiency. However, advancements in such electrical devices are currently limited by existing supercapacitor (SC) technology due to low energy density in comparison to typical batteries. To increase the power density along with the energy density, a hybrid structure of two types of supercapacitors can be created to form a hybrid SC (HSC). The nature and performance of the electrode materials are the keys to developing high-performance HSCs with an elongated life cycle along with high energy/power densities. In conventional HSCs, carbon-based materials are used as a negative electrode, while metal compounds (oxides, hydroxides, layered double hydroxide (LDH), metal-metal oxides (MMO)) are used as the positive electrode. Recently, LDHs have received extensive consideration as the anode materials in HSCs owing to their good ion-exchange properties, structural flexibility, and large surface area, however, conventionally used LDHs suffer from drawbacks such as low conductivity and prevent charge and mass transfer throughout the electrochemical process. Hence, it is one object of the present disclosure to provide a layered dual hydroxide (LDH) composite, which may substantially reduce or eliminate the above limitations.

SUMMARY

In an exemplary embodiment, a layered dual hydroxide (LDH) composite is described. The LDH composite includes a nickel (Ni)-cobalt (Co)-LDH, and nitrogen (N) and sulfur (S) co-doped reduced graphene oxide (rGO-NS). The Ni—Co-LDH is at least partially enfolded by the rGO-NS to form the LDH composite.

In some embodiments, the rGO-NS has a layered sheet structure with 3-10 layers spaced 3.7-5 angstrom (Å) apart. The N and S in the rGO-NS are covalently bound to carbon in the structure.

In some embodiments, the Ni—Co-LDH has a plate structure with a length and a width less than 5 micrometers ($\mu m$), and a thickness less than 20 nanometers (nm).

In some embodiments, the Ni—Co-LDH has a formula of AcB Z AdB, where c is Co, d is Ni, A and B are layers of hydroxide ($HO^-$) anions, and Z are layers of water molecules. The Co is 90-95% $Co^{2+}$ and 5-10% $Co^{3+}$, and Ni is $Ni^{2+}$.

In some embodiments, the Ni—Co-LDH is positively charged, and the rGO-NS is negatively charged. The Ni—Co-LDH and the rGO-NS at least partially interact through electrostatic interactions.

In some embodiments, the elements C, Ni, Co, O, S, and N are homogeneously distributed.

In some embodiments, the Ni—Co-LDH and the rGO-NS at least partially interact through C-M bonds. Here, M is Ni or Co.

In some embodiments, the LDH composite has a surface area of 100-150 square centimeters per gram ($cm^2/g$).

In an exemplary embodiment, an electrode including the LDH composite is described. The electrode including the LDH composite further includes a first substrate, at least one binding compound, and at least one conductive additive. A mixture of 5-15 wt. % of the binding compound, 5-15 wt. % of the conductive additive, and 70-90 wt. % of the LDH composite based on the total weight of the binding compound, conductive additive, and LDH composite, and at least partially coats a first side of the first substrate.

In some embodiments, the binding compound is at least one selected from a group including polyvinylidene fluoride (PVDF) and N-methylpyrrolidone (NMP).

In some embodiments, the conductive additive is at least one selected from a group including graphite, activated carbon (AC), reduced graphene oxide (rGO), carbon nanotubes (CNTs), carbon nanofibers (CNFs), and carbon black.

In some embodiments, the first substrate is formed from at least one material selected from a group including copper, aluminum, nickel, iron, and steel.

In some embodiments, the electrode has a charge transfer resistance of 0.2-0.4 Ohms ($\Omega$).

In some embodiments, the electrode has a specific capacitance (Cs) of 1,100-2,300 Farad per gram (F/g) at a discharge current density of 5-50 ampere per gram (A/g).

In some embodiments, at least 70% of the initial capacitance of the electrode is maintained up to 2,000 cycles.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
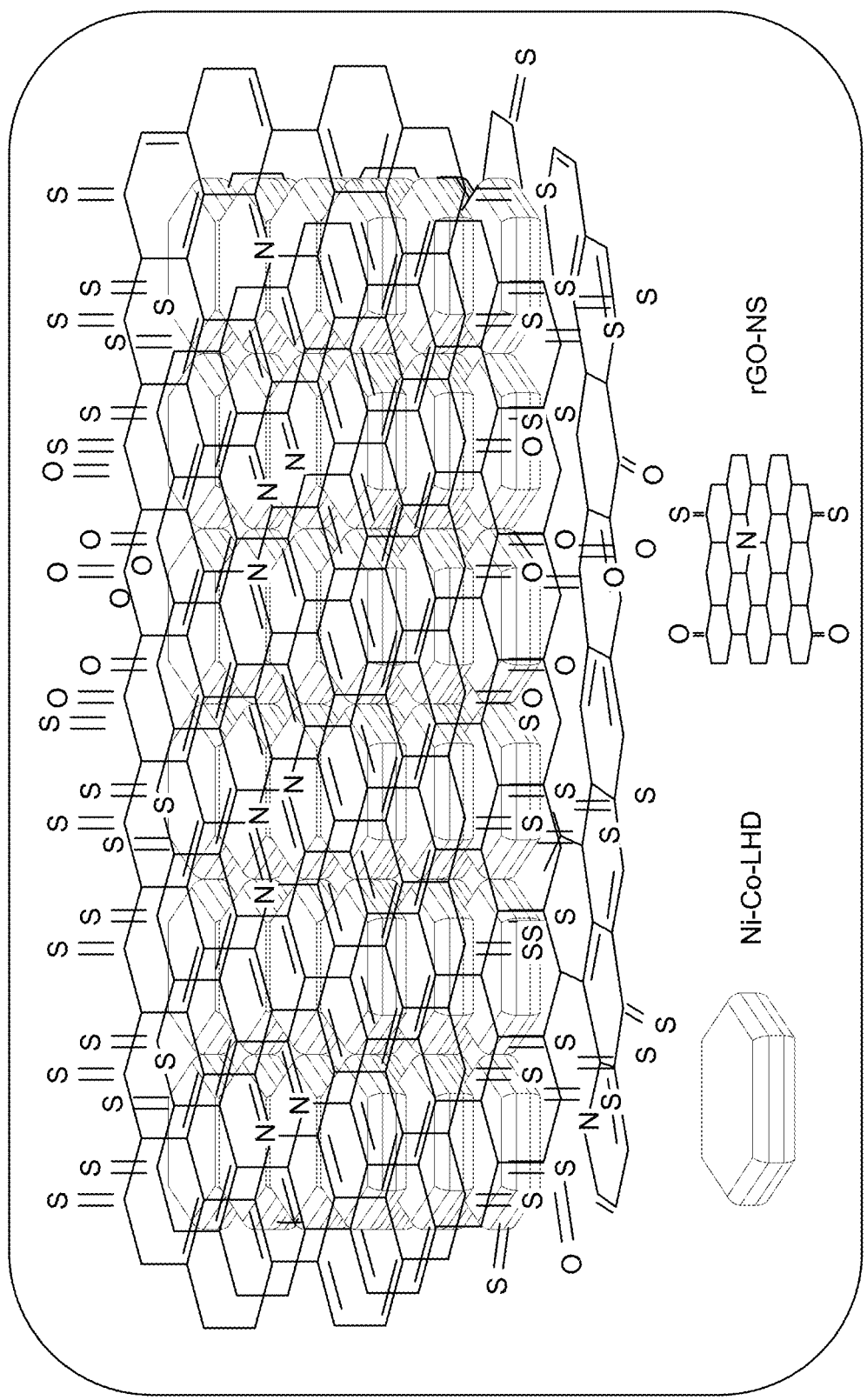
FIG. 1 is a schematic view of a layered dual hydroxide (LDH) composite, according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present invention are directed toward a layered dual hydroxide (LDH) composite, otherwise referred to as the 'composite' or the 'LDH-rGO-NS'. The prepared composite was characterized using various analytical techniques and the electrochemical properties of the electrodes including the composite was studied. The composite of the present disclosure provides excellent conducting properties, high surface area, cost-effectiveness, and enhanced electrochemical properties.

The LDH composite includes a Ni—Co-LDH, and nitrogen (N) and sulfur (S) co-doped reduced graphene oxide (rGO-NS). In some embodiments, the Ni—Co-LDH has a plate structure with a length and a width less than 5 μm, preferably 100-3,000 nm, 500-2,000 nm, or 1,000-1,500 nm and a thickness less than 20 nm, preferably 1-15 nm, or 5-10 nm. In some embodiments, the geometry of the Ni—Co-LDH may include but is not limited to, circular, polygonal, triangular, and rectangular. In some embodiments, the XRD pattern of the Ni—Co-LDH displays the (003) peak at 10-13°, preferably 10.5-12.5°, or 11-12°, the (006) peak at 22-25°, preferably 22.5-24.5°, or 23-24°, the (009) peak at 33-36°, preferably 33.5-35.5°, or 34-35°, and the (015) peak at 37-40°, preferably 37.5-39.5°, or 38-39°, which correspond to a hydrotalcite LDH structure. In some embodiments, the Ni—Co-LDH has a formula of AcB Z AdB. In some embodiments, c is Co, d is Ni, A and B are layers of hydroxide (HO$^-$) anions and Z are layers of water molecules. Further, the Co is 90-95% Co$^{2+}$, preferably 91-95%, or 93-95% Co$^{2+}$ and 5-10% Co$^{3+}$, preferably 5-8%, or 5-6% Co$^{3+}$, and Ni is only Ni$^{2+}$.

Figure 11:
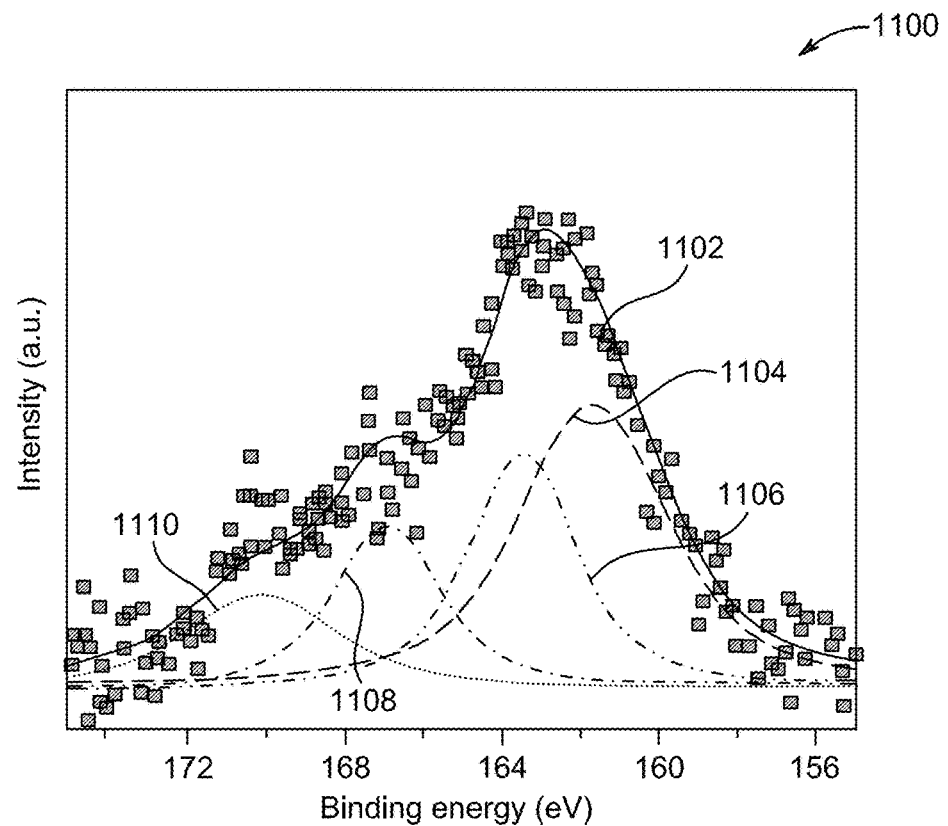
FIG. 11 is a graph representing XPS S 2p spectra of the LDH-rGO-NS, according to certain embodiments.
Figure 12:
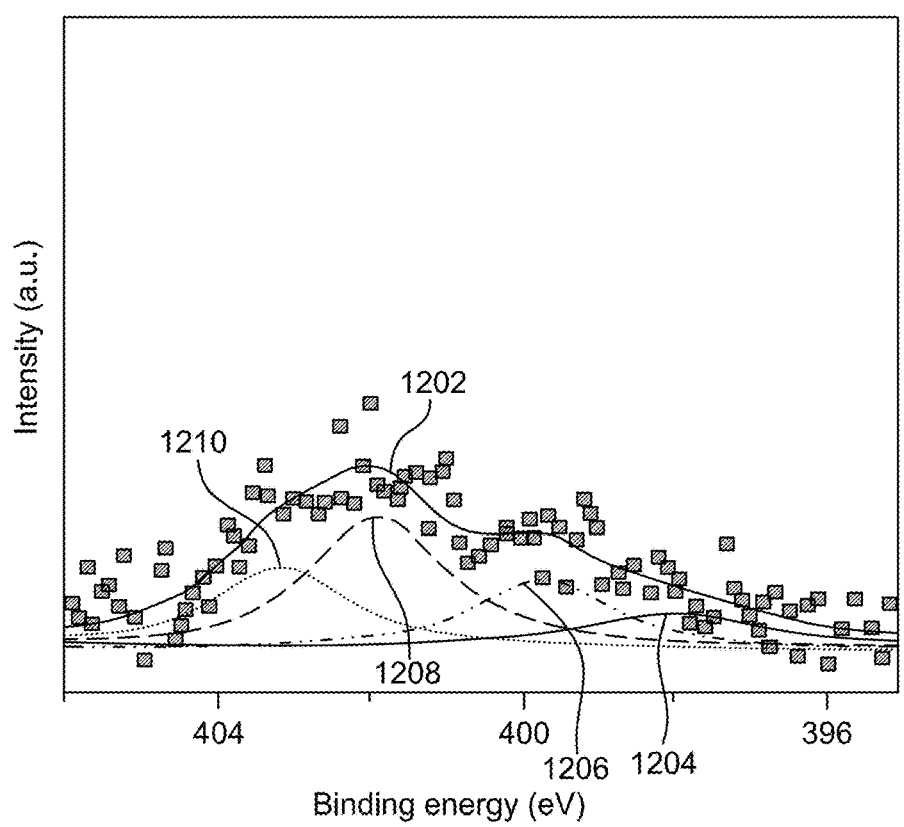
FIG. 12 is a graph representing XPS N 1s spectra of the LDH-rGO-NS, according to certain embodiments.

In some embodiments, the rGO is doped with at least one selected from the group consisting of N, S, phosphorus (P) and boron (B). In some embodiments, the rGO is doped with P and N. In some embodiments, the rGO is doped with P and S. In some embodiments, the rGO-NS has a layered sheet structure with 3-10 layers, preferably 3-8, or 4-5 layers spaced 3.7-5 Å, preferably 3.7-4.5 Å, or 3.9-4.1 Å apart. In an embodiment, the (002) peak of the rGO-NS is at 20-24°, preferably 21-23°, or 22-22.5°, corresponding to the small spacing between the layers indicating a lack of oxygen functional groups in the structure. In some embodiments, the N and S are covalently bound to carbon in the layered sheet structure. In FIG. 11 two peaks are corresponding to S $2p_{3/2}$ and S $2p_{1/2}$ located at 160-163 eV, preferably 160.5-162.5, or 161-162 eV and 162-165 eV, preferably 162.5-164.5, or 163-164 eV, respectively, and two peaks associated with oxidized S of lower intensity are observed at 166-169 eV, preferably 166.5-168.5, or 167-168 eV, and 169-172 eV, preferably 169.5-171.5, or 170-171 eV, indicating the presence of oxidized sulfur covalently bound to the C in the layered sheet structure. FIG. 12 shows a detailed XPS N is peak deconvoluted into four peaks positioned at 396-399 eV, preferably 396.5-398.5, or 397-398 eV, 398-401 eV, preferably 398.5-400.5, or 399-400 eV, 400-403 eV, preferably 400.5-402.5, or 401-402 eV, and 402-405 eV, preferably 402.5-404.5, or 403-404 eV, which correspond to pyridinic-N, pyrrolic-N, graphitic-N, and oxidized-N, respectively indicating the presence of nitrogen covalently bound to the C in the layered sheet structure. In an embodiment, the rGO-NS has 12-16% pyridinic-N, preferably 13-15%, or 13.5-14%, 19-23% pyrrolic-N, preferably 20-22%, or 21-21.5%, 39-43% graphitic-N, preferably 40-42%, or 41-41.5% and 22-26% oxidized-N, preferably 23-25%, or 24-24.5%.

Figure 8:
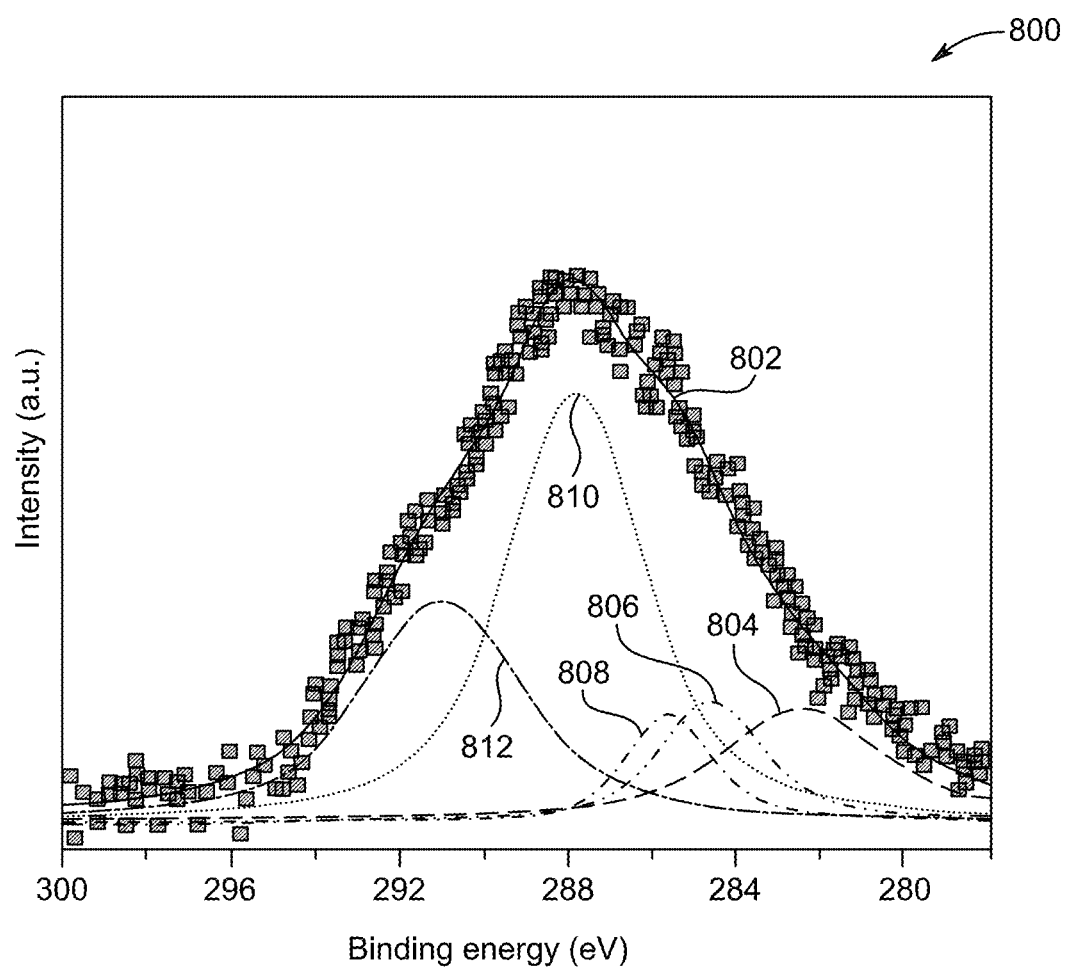
FIG. 8 is a graph representing XPS C is spectra of the LDH-rGO-NS, according to certain embodiments.

FIG. 1 refers to a schematic view of the LDH composite. In some embodiments, the Ni—Co-LDH is at least partially enfolded by the rGO-NS to form the LDH composite. In some embodiments, 10% of the LDH is enfolded by the rGO-NS, preferably 20%, 30%, 40%, 50%, 60%, 70%, 80%, 90%, or the entire LDH is enfolded by the rGO-NS. In some embodiments, the Ni—Co-LDH is positively charged and the rGO-NS is negatively charged. In an embodiment, the Ni—Co-LDH and the rGO-NS partially interact through electrostatic interactions, due to the difference in charge. In an alternate embodiment, the Ni—Co-LDH and the rGO-NS completely interact through electrostatic interactions. In an embodiment, the Ni—Co-LDH and the rGO-NS partially interact through C-M bonds. In an alternate embodiment, the Ni—Co-LDH and the rGO-NS completely interact through C-M bonds. Herein, M is Ni or Co. FIG. 8 shows the XPS spectra which includes peak 804, at 281-284 eV, preferably 282-283.5, or 282-283 eV, corresponding to C-M bonds (C—Ni, and/or C—Co) in the LDH composite. In an embodiment, the Ni—Co-LDH and the rGO-NS interact 50% through electrostatic interactions, and 50% through C-M bonds. In an embodiment, the elements such as C, Ni, Co, O, S, and N are homogeneously distributed throughout the LDH composite. In some embodiments, the LDH composite includes a surface area of 100-150 cm$^2$/g, preferably 120-140, or 130-135 cm$^2$/g.

In an embodiment, an electrode including the LDH composite further includes a first substrate, at least one binding compound, and at least one conductive additive. In some embodiments, the first substrate is formed from one or more materials selected from a group including copper, aluminum, nickel, iron, steel, titanium, brass, silver, and platinum. In an embodiment, the first substrate is nickel foam.

Figure 23:
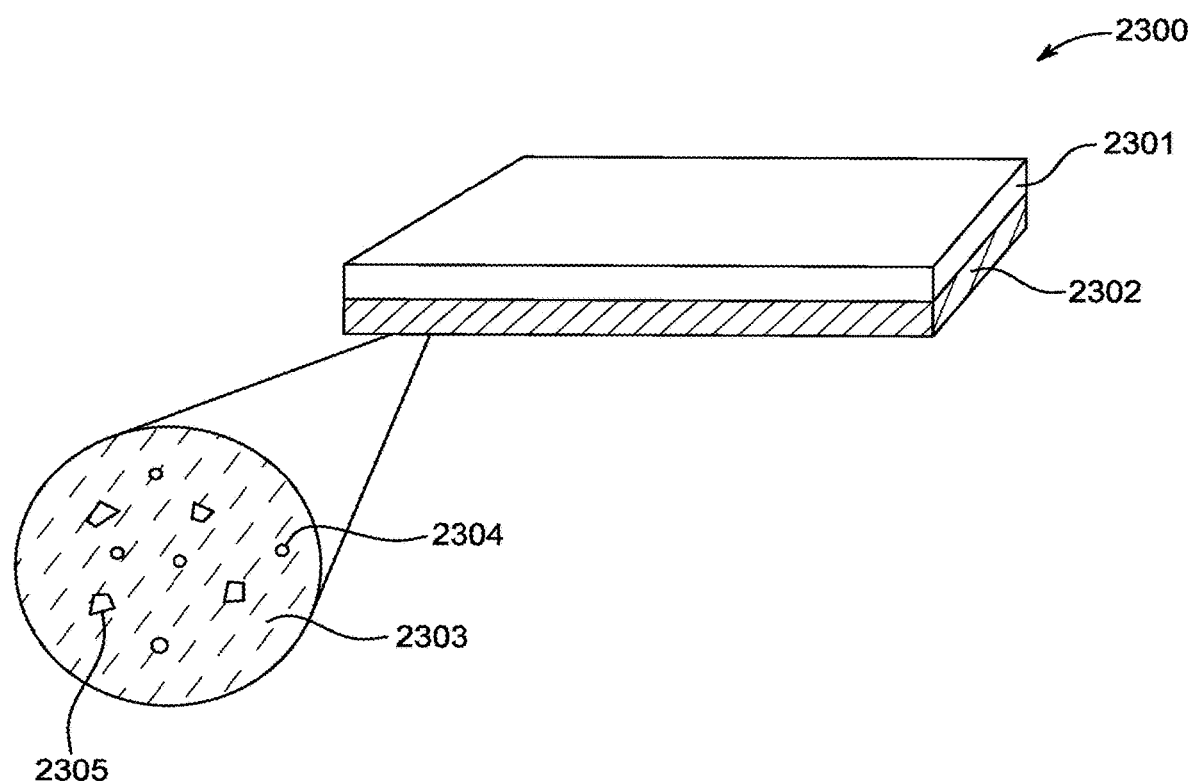
FIG. 23 is a schematic view of an electrode comprising an LDH composite in an embodiment of the invention.

FIG. 23 refers to a schematic view of the electrode (2300). The substrate (2301) is coated with an LDH composite (2302). The LDH composite (2303) contains a binding compound (2305) and a conductive additive (2304).

In one embodiment, the binding compound is one or more selected from a group consisting of N-methyl pyrrolidone, polyvinylidene fluoride (PVDF)-based polymers, and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In an embodiment, the binding compound is polyvinylidene fluoride.

The electrode further includes one or more conductive additives. The binding compound and the conductive additives in a cathode composite electrode impart a firm structure and a continuous conduction path. In some embodiments, the conductive additive is one or more selected from a group including graphite, activated carbon (AC), reduced graphene oxide (rGO), carbon nanotubes (CNTs), carbon nanofibers (CNFs), and carbon black. In an embodiment, the conductive additive is carbon black.

In an embodiment, a first mixture includes 5-15 wt. % of the binding compound, preferably 5-10 wt. %, or 5-8 wt. %, 5-15 wt. % of the conductive additive, preferably 5-10 wt. %, or 5-8 wt. %, and 70-90 wt. % of the LDH composite, preferably 75-90 wt. %, or 80-90 wt. % based on the total weight of the binding compound, conductive additive, and LDH composite. In an embodiment, the first mixture includes 10 wt. % of the binding compound, 10 wt. % of the conductive additive, and 80 wt. % of the LDH composite, based on the total weight of the binding compound, conductive additive, and LDH composite. In an embodiment, the mixture partially coats a first side of the first substrate such that the mixture covers at least 75% of the first side, preferably 80%, 90%, of the first side. In an alternate embodiment, the mixture completely coats the first side of the first substrate.

Electrochemical properties of the electrode comprising the LDH composite are measured in a three electrode system with the LDH composite electrode as the working electrode, and Pt and Hg/HgO as the counter and reference electrodes, respectively, placed in a solution of an electrolyte. In an embodiment, the electrolyte is any electrolyte known in the art such as an aqueous solution of an alkaline earth metal salt, an alkali metal salt, an alkaline earth metal hydroxide, or an alkali metal hydroxide. In an embodiment, the electrolyte is a potassium hydroxide solution. In some embodiments, the LDH composite electrode includes a charge transfer resistance of 0.2-0.4Ω, preferably 0.2-0.35, or 0.22-0.28Ω. In some embodiments, the electrode includes a specific capacitance of 1,100-2,300 F/g, preferably 1,500-2,300, or 2,000-2,300 F/g at a discharge current density of 5-50 A/g. In some embodiments, at least 70%, preferably 80%, or 100% of the initial capacitance is maintained up to 2,000 cycles.

EXAMPLES

The following examples describe and demonstrate exemplary embodiments of the LDH composite described herein. The examples are provided solely for the purpose of illustration and are not to be construed as limitations of the present disclosure, as many variations thereof are possible without departing from the spirit and scope of the present disclosure.

Material Required

Graphite, Hydrofluoric acid (HF), acetone ($C_3H_6O$), sodium nitrate ($NaNO_3$), sulphuric acid ($H_2SO_4$), potassium permanganate ($KMnO_4$), hydrochloric acid (HCl), thiourea ($CH_4N_2S$), Nickel nitrate hexahydrate ($Ni(NO_3)_2 \cdot 6H_2O$), cobalt nitrate hexahydrate ($Co(NO_3)_2 \cdot 6H_2O$), hydrogen peroxide ($H_2O_2$), de-ionized water (DI water) and ethanol ($C_2H_5OH$).

Experimental

Example 1: Purification of Graphite Flakes 2 grams (g) of graphite was added to a beaker including 30 milliliters (mL) of concentrated HF. A homogeneous mixture was prepared via mechanical stirring at room temperature (RT). After 1 h, graphite flakes, also referred to as the graphite, were allowed to settle down and the HF acid was decanted. The graphite flakes were washed thoroughly using a large amount of DI water to achieve pH 7, and further dispersed in 20 mL acetone followed by drying in a vacuum oven at 100 degrees Celsius (° C.).

GO Synthesis

For the oxidation of the graphite flakes, 1 g of $NaNO_3$ was mixed with the purified graphite flakes (2 g) to form a mixture. Concentrated $H_2SO_4$ was taken into a glass beaker contained in an ice bath. The mixture was slowly added to $H_2SO_4$. Then $KMnO_4$ (6 g) was added under vigorous stirring, and the temperature was maintained at less than 20° C. After stirring for 10 minutes, the ice bath was replaced with a water bath and the temperature was raised to 35° C. The mixture was kept under constant stirring at 35° C. for 24 hours. 150 mL of DI water was added to the mixture, followed by adding 2.5 mL $H_2O_2$ and 240 mL DI water to complete the oxidation of the graphite. The mixture was further washed with HCl, DI water, and $C_2H_5OH$, and dried under vacuum at 25° C., to obtain oxidized graphite flakes. The oxidized graphite flakes, also referred as GO powder, were dispersed in DI water (2 mg/mL) to form a GO solution. The exfoliation of GO nanosheets was achieved via 2 to 4 hours of ultra-sonication.

Synthesis of rGO-NS 0.01 mole $CH_4N_2S$ was dissolved to form the GO solution. The pH value was kept in the range of 8-9. The resultant solution A (rGO-NS) was stirred for 30 minutes.

Synthesis of Ni—Co-LDH $Ni(NO_3)_2 \cdot 6H_2O$ was used as a Ni source, and $Co(NO_3)_2 \cdot 6H_2O$ was used as a Co source. For the synthesis, the Ni and Co sources were mixed in a molar ratio of 3:2 to form a mixture. The mixture was dissolved in DI water. The pH was adjusted to 9-10. The resultant solution B (Ni—Co-LDH) was stirred for 60 minutes.

Synthesis of LDH-rGO-NS

The solution A (rGO-NS) and solution B (Ni—Co-LDH) were mixed form a mixture, followed by stirring for 1 hour. The mixture was shifted to a Teflon™ lined autoclave, and was hydrothermally treated at 180° C. for 12 hours to obtain the LDH-rGO-NS. The LDH-rGO-NS was separated by vacuum filtration. Then the LDH-rGO-NS was thoroughly washed with DI water and $C_2H_5OH$. Eventually, the LDH-rGO-NS was dried under vacuum at RT.

Example 2: Materials Characterization

High-resolution X-ray diffraction (HR-XRD) characterization was done using a diffractometer (Empyrean, PAN analytical, USA). Raman spectra were obtained using a confocal Raman spectrometer (Nicolet Almega XR Raman, Thermo Fisher Scientific, USA). The used excitation wavelength was 532 nm. X-ray photoelectron spectrometry (XPS: Thermo Scientific, ESCALAB 250Xi) was used to study the elemental composition of the LDH-rGO-NS. The XPS was equipped with a monochromatic Al Kα X-ray source (1486.6 electron volt (eV)), and was operated under an ultra-high-vacuum apparatus. An XPS C 1s peak was used to calibrate concerning to other elements. Field emission scanning electron microscopy (FE-SEM) images were obtained using FE-SEM (Hitachi, S-4800). Transmission electron microscopy (TEM) and high-resolution TEM (HR-TEM: HF-3300/NB5000/S-4800, Hitachi, Japan) were used to analyze the atomic structure of the LDH-rGO-NS. Nitrogen adsorption-desorption analysis was conducted at 77 Kelvin (K) using an analyzer (Micromeritics, Flex 3.02, USA).

Example 3: Electrode Formation and Electrochemical Characterization

Nickel foams were cleaned in 10% HCl via sonication and rinsed in DI water. The nickel foams were further dried in an oven under a vacuum. A working electrode, also referred to as the positive electrode, was made using a slurry (including 80 wt. % LDH-rGO-NS, 10 wt. % PVDF, and 10 wt. % super P (conductive additive) dissolved in $C_2H_5OH$) uniformly coated onto a cleaned Ni-foam. The coated Ni-foam was dried at 120° C. (in vacuum). Further, a pressure of 10 Megapascal (MPa) was applied on the coated Ni-foam for 60 seconds (s).

Electrochemical properties were determined using a three-electrode system. A potentiostat (VersaSTAT3, Princeton Applied Research, USA) was used for measurements. The LDH-rGO-NS (in the nickel foam, the loading mass of the LDH-rGO-NS is ~1 mg $cm^{-2}$) is used as a working electrode. However, platinum (Pt) and mercury/mercury oxide (Hg/HgO) were used as counter and reference electrodes, respectively. The electrodes were characterized using electrochemical impedance spectroscopy (EIS), cyclic voltammetry (CV), and galvanostatic charge-discharge (GCD) in a 6 molar (M) KOH aqueous solution. The EIS measurement was done in a frequency range of 0.05 hertz (Hz) to 100 kHz by applying alternating current (AC) voltage with five (5) millivolts (mV) perturbation. The EIS data were analyzed using Nyquist plots, presenting real (Z') and imaginary (Z") parts of the impedance. CV curves were obtained at sweep rates (v) of 2, 5, 20, 50, 100, and 200 $mVs^{-1}$ in a voltage-sweep mode with a potential window from 0.1 to 0.6 V (vs. Hg/HgO). The GCD measurement was conducted in the potential range of 0-0.5 V (vs. Hg/HgO) at current densities of 5 $Ag^{-1}$, 10 $Ag^{-1}$, 20 $Ag^{-1}$, and 50 $Ag^{-1}$.

Figure 2A:
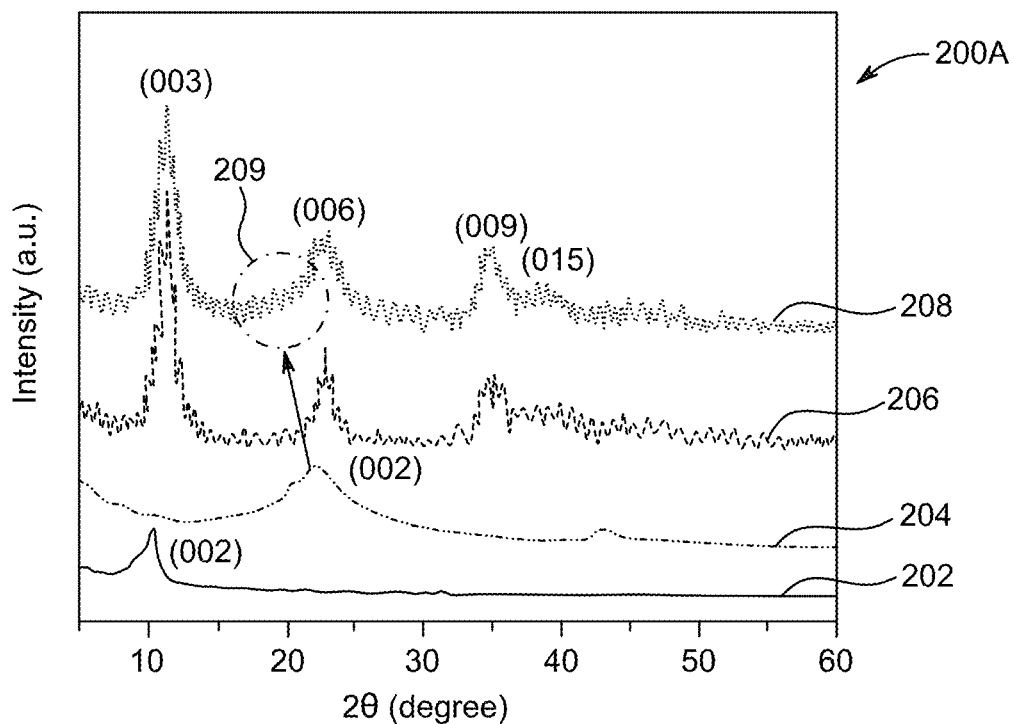
FIG. 2A is a graph representing X-ray diffraction (XRD) structural phases of GO, rGO-NS, Ni—Co-LDH, and LDH-rGO-NS, according to certain embodiments of the present disclosure.

FIG. 2A, refers to a graph 200A, representing structural phases of the GO, rGO-NS, Ni—Co-LDH, and LDH-rGO-NS. The graph 200A, otherwise referred to as the XRD image 200, includes a first trend line 202 referring to the GO, a second trend line 204 referring to the RGO-NS, a third trend line 206 referring to the Ni—Co—Co-LDH, and a fourth trend line 208 referring to the LDH-rGO-NS. The XRD characterization was done in the 2θ range from 5° to 60°. The first trend line 202 shows a diffraction peak at 2θ=10.37° corresponding to the (002) plane. The peak was shifted to 2θ=22.15° after reaction with thiourea and a hydrothermal process which indicates a reduction in the value of interlayer spacing (d-spacing).

The d-spacing ($d_{002}$) between parallel basal planes of the GO and rGO-NS were calculated corresponding to (002) planes. The obtained $d_{002}$ value of the GO (8.5 Å) was larger than the d-spacing of the graphite ($d_{002}$=3.37 Å corresponding to $2\theta$=26.4°). Hence, the obtained $d_{002}$ values confirm the oxidation of the graphite flakes. However, the d-spacing of the rGO-NS was further reduced to 4.0 Å. The compressed d-spacing value refers to the elimination of oxygen-related functional groups. Thus, a significant reduction of the GO arose through the hydrothermal process. Moreover, the peak at $2\theta$=42.66° was corresponded to the (101) plane. A broad diffraction peak of the second trend line 204 indicates that the d-spacing of graphite was expanded by the exfoliation. The third trend line 206 shows diffraction peaks at $2\theta$=11.28°, 22.57°, 34.46°, and 38.49° corresponding to (003), (006), (009), and (015) planes, respectively. The fourth trend line 208 is similar to the third trend line 206, which confirms the presence of the Ni—Co-LDH in the LDH-rGO-NS. Moreover, the influence of the rGO-NS can be seen in the fourth trend line 208 (a circle 209), which confirms the existence of the rGO-NS.

Figure 2B:
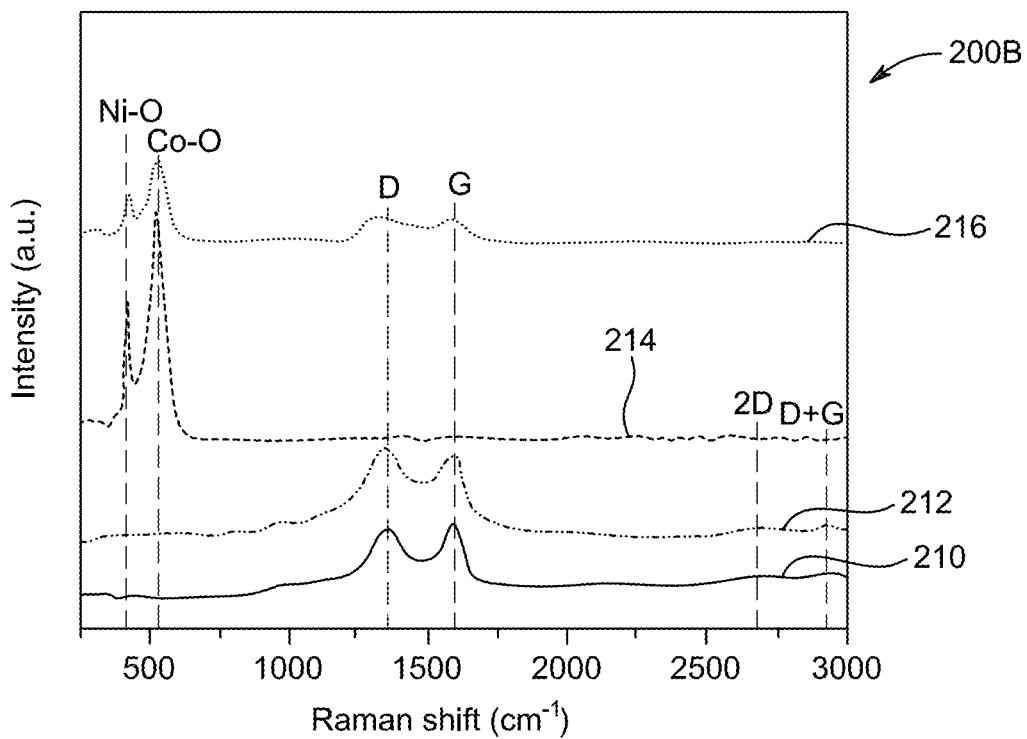
FIG. 2B is a graph representing Raman spectroscopy of the GO, rGO-NS, Ni—Co-LDH, and LDH-rGO-NS, according to certain embodiments of the present disclosure.

FIG. 2B, refers to a graph 200B, representing Raman spectroscopy of the GO, rGO-NS, Ni—Co-LDH, and LDH-rGO-NS, respectively. The graph 200B includes a first trend line 210 referring to the GO, a second trend line 212 referring to the rGO-NS, a third trend line 214 referring to the Ni—Co-LDH, and a fourth trend line 216 referring to the LDH-rGO-NS. In the first trend line 210, Raman peaks are observed at 1354, 1594, 2677, and 2922 $cm^{-1}$ designated as D, G, 2D, and D+G, respectively. The D and G peaks correspond to the in-plane vibration of $sp^2$ carbon atoms and defects in the GO, respectively. The D peak is downshifted to 1337 $cm^{-1}$ and 1332 $cm^{-1}$ for the rGO-NS and LDH-rGO-NS, respectively. The downshifting of the D peak may have occurred between N doping and S doping. Peak positions of G, 2D, and D+G were unaffected for the rGO-NS. The peaks corresponding to 2D and D+G bands disappeared in the LDH-rGO-NS. However, peaks corresponding to D and G bands are present in the LDH-rGO-NS with lower intensity. The third trend line 214 shows peaks at 417 $cm^{-1}$ and 528 $cm^{-1}$ corresponding to the vibrational mode of Ni—O, and Co—O, respectively. Therefore, the peaks at 417 $cm^{-1}$ and 528 $cm^{-1}$ also appeared in the LDH-rGO-NS. Further, the LDH-rGO-NS also retains D and G bands of rGO-NS. The present result revealed the presence of the Ni—Co-LDH and rGO-NS in the LDH-rGO-NS sample.

The obtained intensity ratio of the D and G peaks ($I_D/I_G$) for the GO, rGO-NS, and LDH-rGO-NS are found to be 0.96, 1.13, and 1.11, corresponding to a reduction of the GO and an increase in disorder of the graphene. The increase in the $I_D/I_G$ value reveals the creation of compact $sp^2$ graphitic domains with the reduction of GO.

Figure 3A:
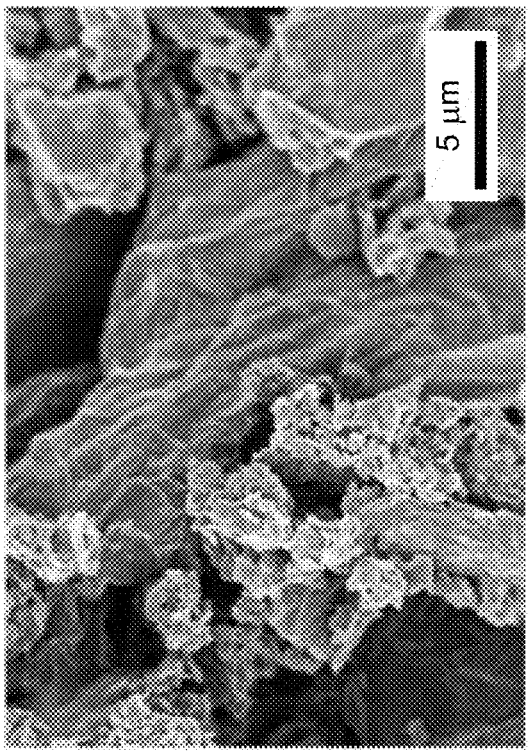
FIG. 3A is a field emission scanning electron microscope (FE-SEM) image of the GO, according to certain embodiments of the present disclosure.
Figure 3B:
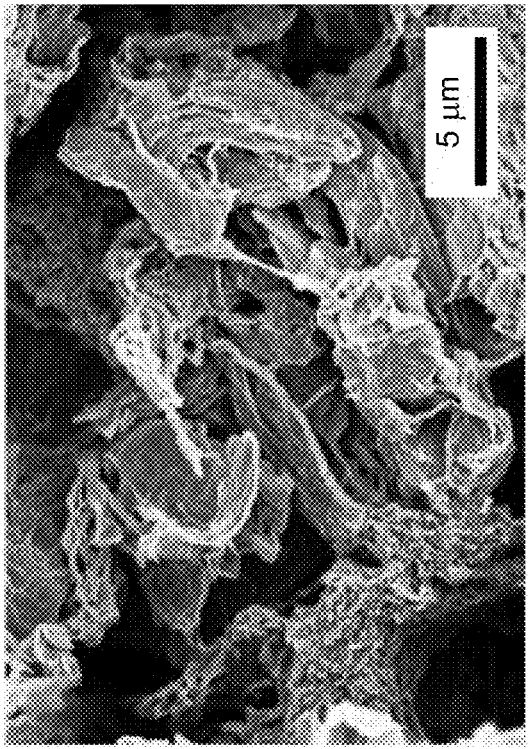
FIG. 3B is the FE-SEM image of the rGO-NS, according to certain embodiments of the present disclosure.
Figure 3C:
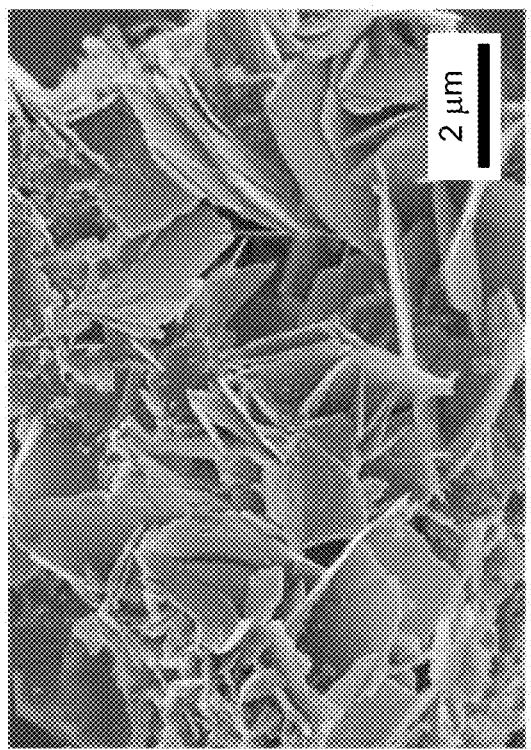
FIG. 3C is the FE-SEM image of the Ni—Co-LDH, according to certain embodiments of the present disclosure.
Figures 3D, 3E:
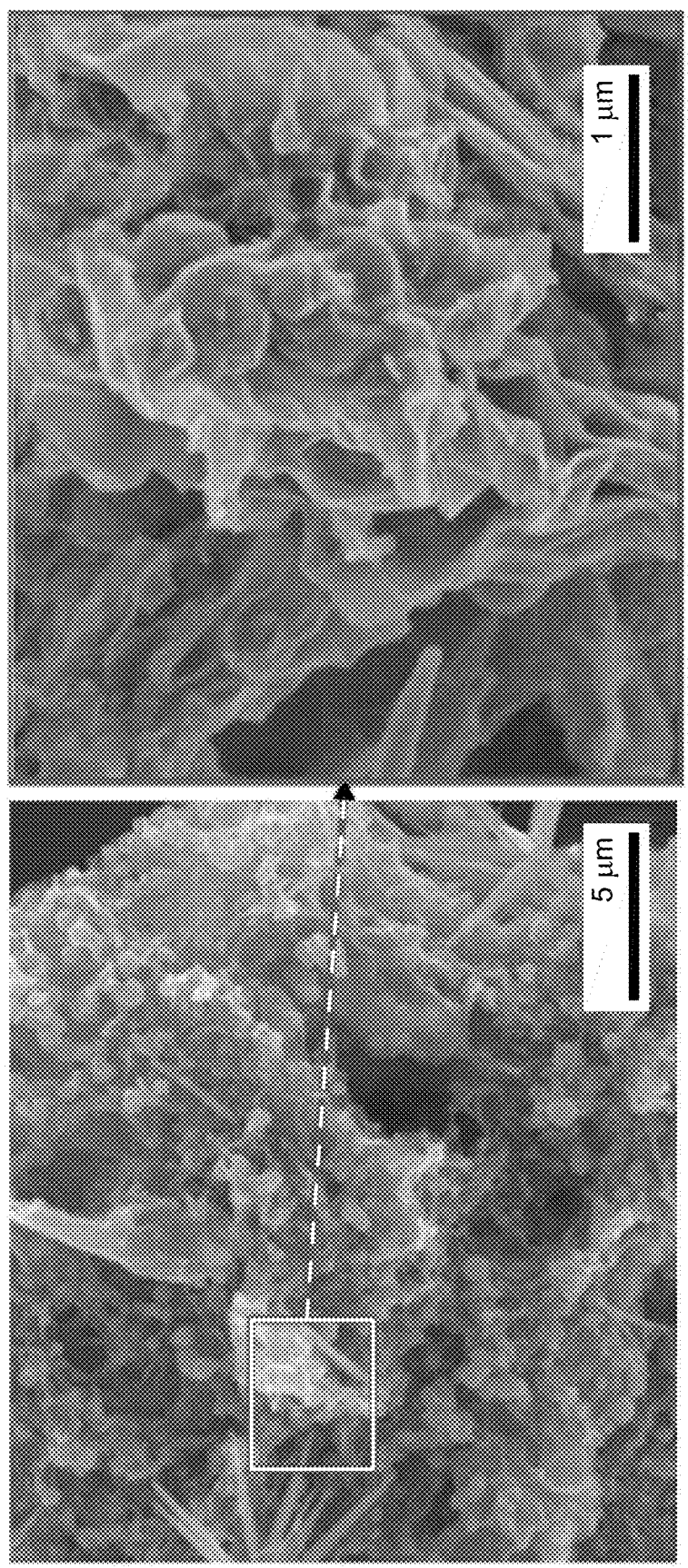
FIG. 3D is the FE-SEM image of the LDH-rGO-NS at a magnification of 5 micrometers (5μ), according to certain embodiments of the present disclosure.
FIG. 3E is the FE-SEM image of the LDH-rGO-NS at a magnification of 1 micrometer (1μ), according to certain embodiments of the present disclosure.
Figures 4A, 4B:
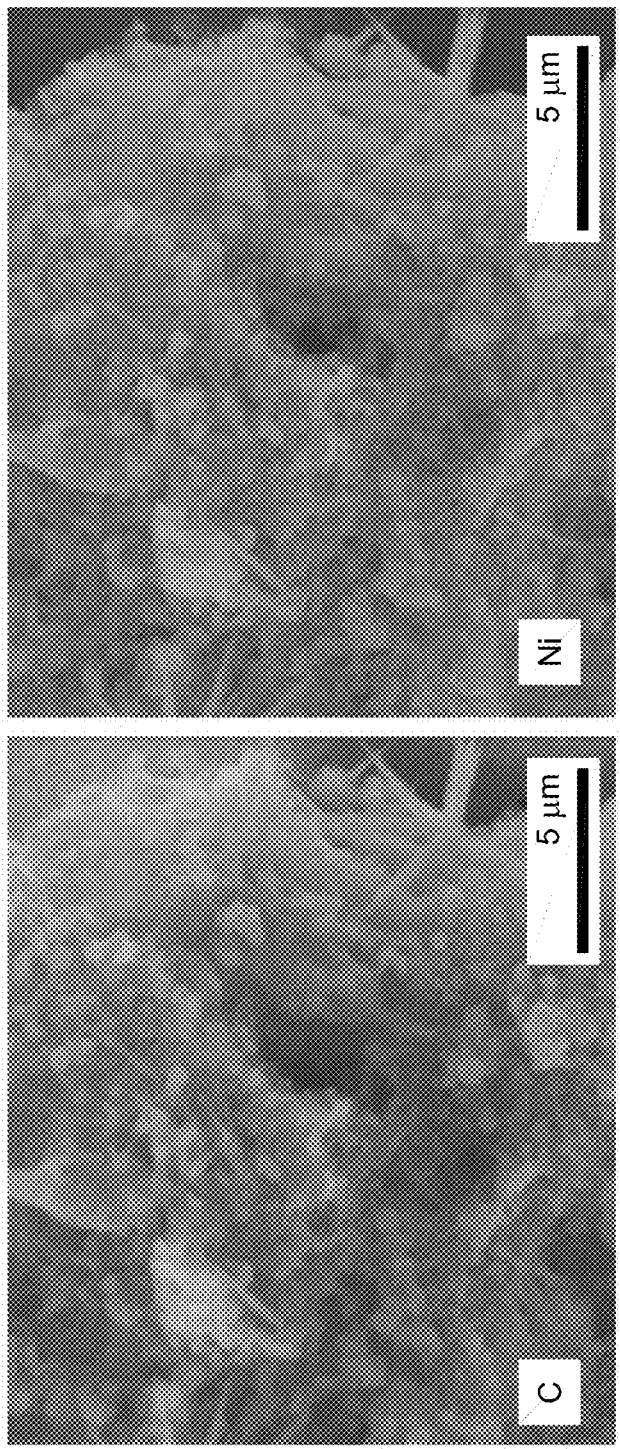
FIG. 4A is an Energy Dispersive Spectroscopy (EDS) mapping of the LDH-rGO-NS for C, according to certain embodiments of the present disclosure.
FIG. 4B is the EDS mapping of the LDH-rGO-NS for Ni, according to certain embodiments of the present disclosure.
Figures 4C, 4D:
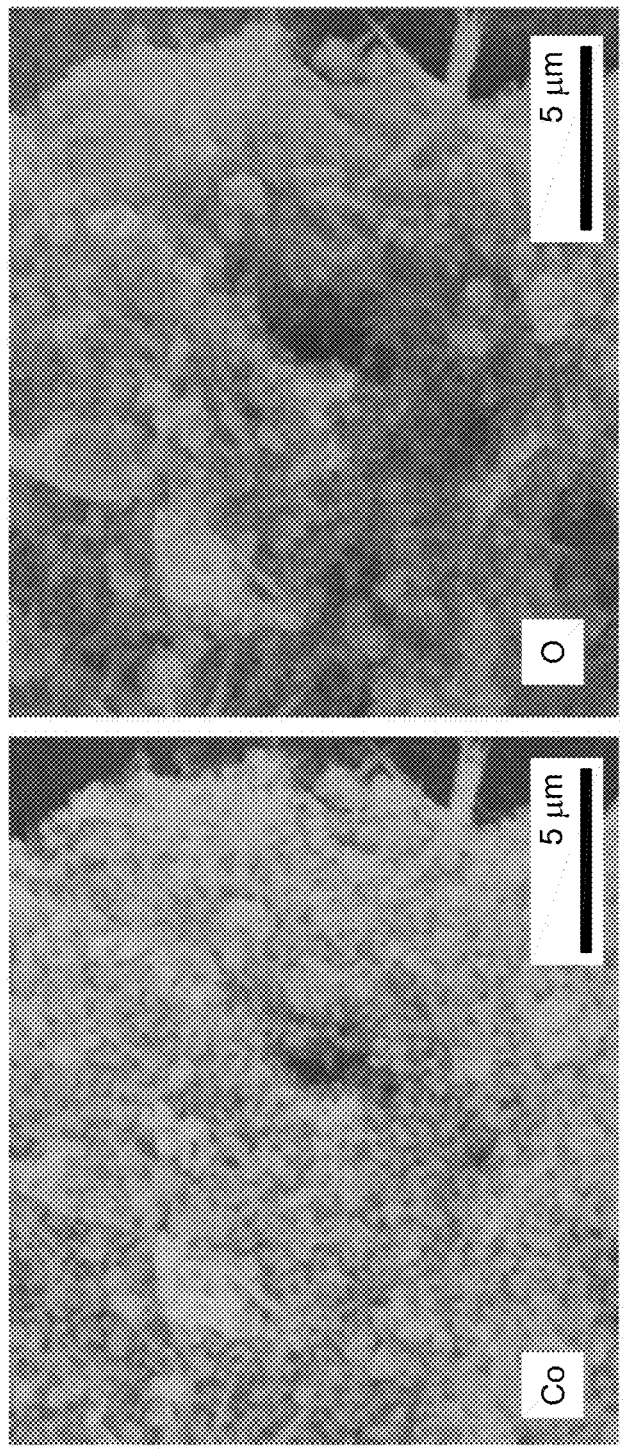
FIG. 4C is the EDS mapping of the LDH-rGO-NS for Co, according to certain embodiments of the present disclosure.
FIG. 4D is the EDS mapping of the LDH-rGO-NS for O, according to certain embodiments of the present disclosure.
Figures 4E, 4F:
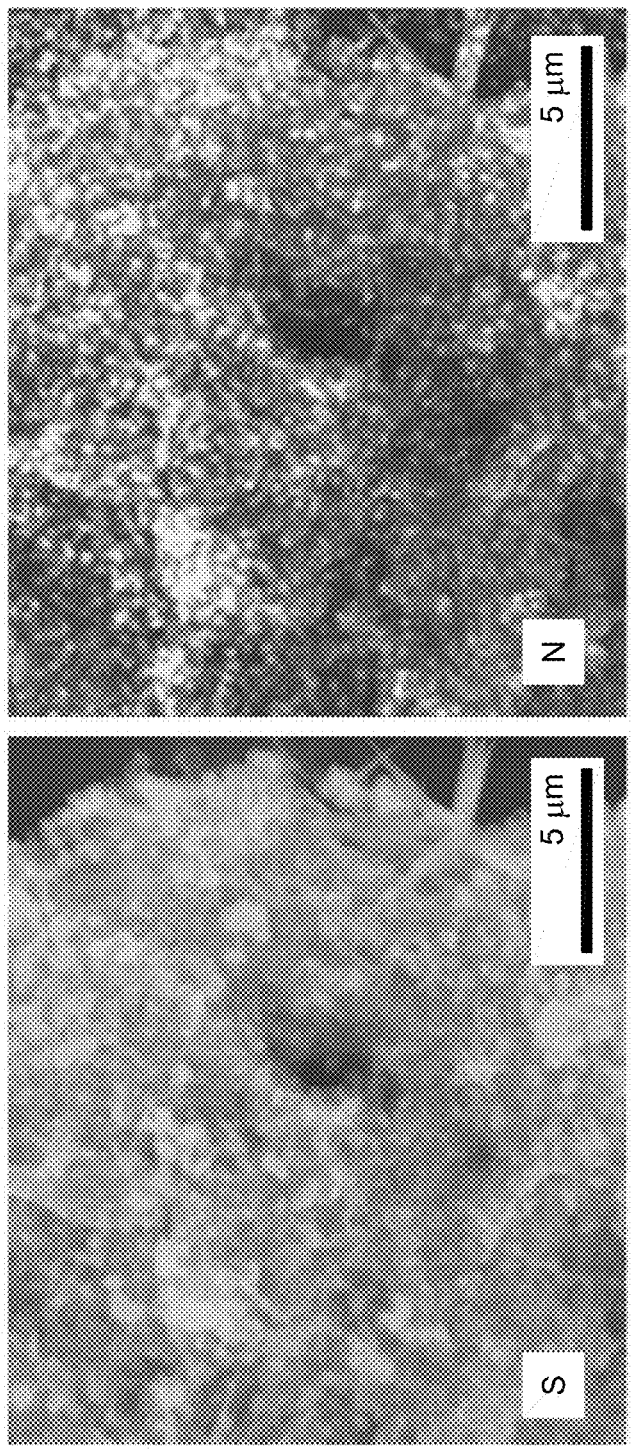
FIG. 4E is the EDS mapping of the LDH-rGO-NS for S, according to certain embodiments of the present disclosure.
FIG. 4F is the EDS mapping of the LDH-rGO-NS for N, according to certain embodiments of the present disclosure.

FIG. 3A-FIG. 3C refer to FE-SEM images of the GO, rGO-NS, and Ni—Co-LDH, respectively. FIG. 3C shows a nanosheet-like structure of the Ni—Co-LDH. However, the FE-SEM images of the LDH-rGO-NS at various magnifications are displayed in FIGS. 3D-3E. The Ni—Co-LDH structures are enfolded by the wrinkled rGO-NS (FIG. 3D). The rGO-NS are doped and reduced during the heating of the mixture solution with thiourea. The Ni—Co-LDH and the rGO-NS are positively and negatively charged, respectively. Hence the Ni—Co-LDH is held by the rGO-NS in the synthesized LDH-rGO-NS. Thus, during the stirring process of the mixture solution of the rGO-NS and Ni—Co-LDH, the Ni—Co-LDHs are properly wrapped off with the rGO-NS (FIG. 3E). Electrostatic interactions between the RGO-NS and Ni—Co-LDH may lead to such wrapping-off. FIGS. 3D-3E shows that the Ni—Co-LDH structures are retained by the wrinkled rGO-NS. Thus, the rGO-NS wrapping the Ni—Co-LDH provides flexibility to bear the volume expansion of the Ni—Co-LDH throughout a charge-discharge cycle.

Figures 5A, 5B:
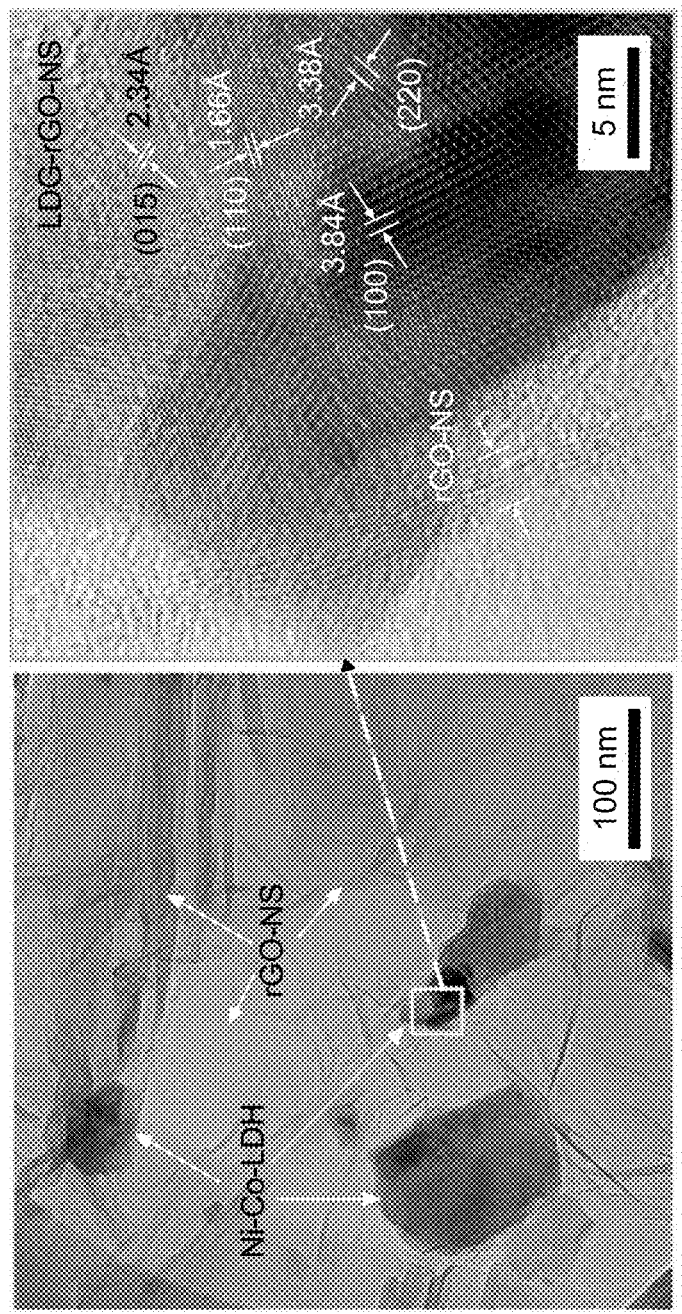
FIG. 5A is a transmission electron microscopy (TEM) image of the LDH-rGO-NS, according to certain embodiments.
FIG. 5B is a high-resolution transmission electron microscopy (HR-TEM) image of the LDH-rGO-NS, according to certain embodiments.

FIGS. 4A-4F are EDS mappings of elements doped and elemental dispersal in Ni—Co-LDH. FIGS. 4A-4F show the presence of C, Ni, Co, O, S, and N elements which are homogeneously distributed. Moreover, a TEM image of the LDH-rGO-NS also confirms a wrapping of the Ni—Co-LDH with the graphene (FIG. 5A). The rGO-NS have 4-5 layers, which wrap the Ni—Co-LDH. Furthermore, a HR-TEM image (FIG. 5B) of the LDH-rGO-NS shows lattice fringes with the d-spacing of 3.93 Å, 2.60 Å, and 2.34 Å corresponding to (006), (009), and (015) planes, respectively.

Figure 6:
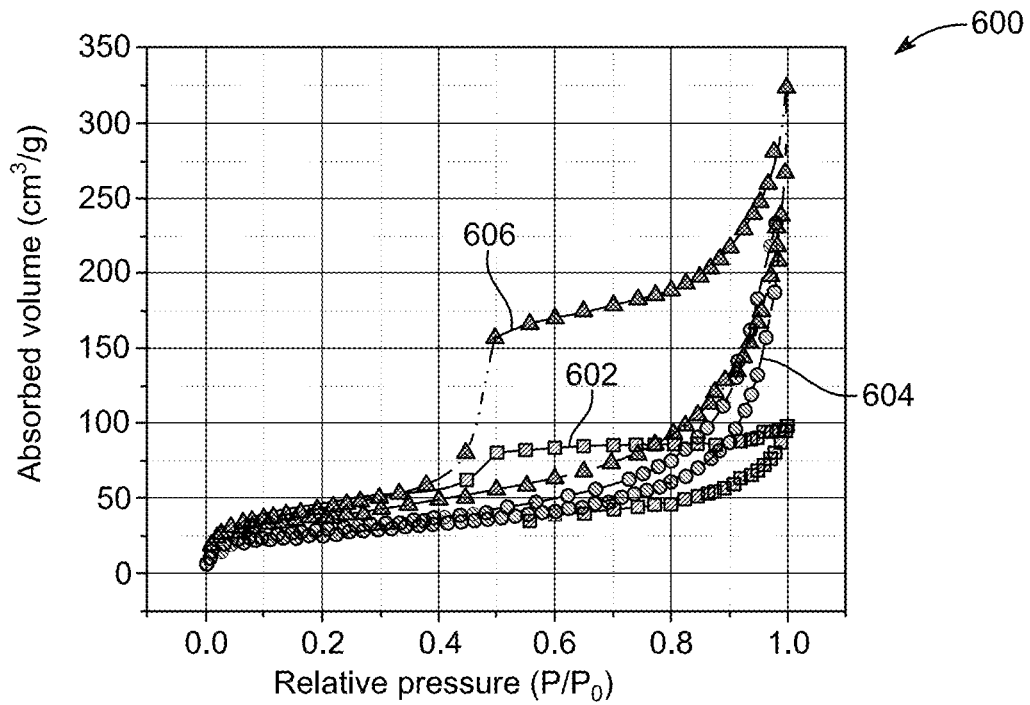
FIG. 6 is a Brunauer-Emmett-Teller (BET) plot of the rGO-NS, Ni—Co-LDH, and LDH-rGO-NS, according to certain embodiments.

FIG. 6 refers to a BET plot 600. The BET plot 600 measures the specific surface area of the rGO-NS, Ni—Co-LDH, and LDH-rGO-NS. The BET plot 600 includes a first BET area 602 referring to the surface area of the rGO-NS, a second BET area 604 referring to the surface area of the Ni—Co-LDH, a third BET area 606 referring to the surface area of the LDH-rGO-NS. The first, second, and third BET areas 602, 604, 606, respectively, are 95.4, 27.5, and 131 $cm^2\,g^{-1}$, respectively. The BET plot 600 reveals an enhanced BET surface area of the LDH-rGO-NS after insertion of the rGO-NS, which is advantageous for the electrode.

Elemental Analysis

Figure 7:
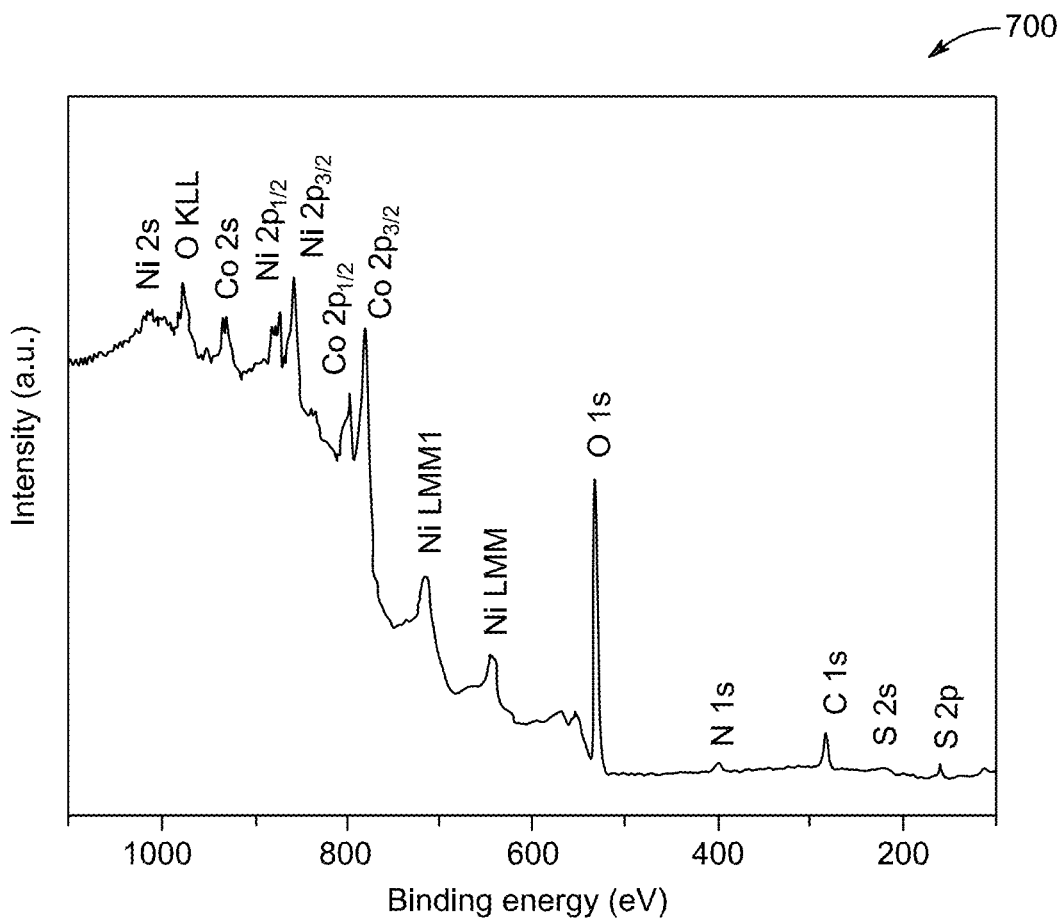
FIG. 7 is a graph representing X-ray photoelectron spectroscopy (XPS) survey spectra of the LDH-rGO-NS, according to certain embodiments.

FIG. 7 refers to a graph 700, representing XPS survey spectra of the LDH-rGO-NS. The elemental composition was analyzed using the XPS characterization technique. The XPS survey spectra confirm the existence of the C, Ni, Co, O, S, and N elements in the LDH-rGO-NS. The XPS signature of the C, Ni, Co, S, and N peaks obtained by the detailed scan are illustrated in FIGS. 8-12, respectively. A Gaussian-Lorentzian function was employed to fit the XPS data, while Shirley technique was employed for background rectification.

FIG. 8 refers to a plot 800 representing the XPS C is spectra of the LDH-rGO-NS. The graph 800 includes a fit line 802, which is deconvoluted into a first trend line 804 referring to C-M (M=Ni or Co), a second trend line 806 referring to C—C/C═C, a third trend line 808 referring to C═N/C—O/C—S, a fourth trend line 810 referring to C—N/C═O and a fifth trend line 812 referring to O—C═O. Peaks obtained at 282.42, 284.41, 285.60, 287.82, and 291.11 eV refer to C-M (M=Ni or Co), C—C/C═C, C═N/C—O/C—S, C—N/C═O, and O—C═O, respectively. The obtained corresponding percentage of C-bonding is 13.20%, 9.35%, 6.99%, 44.26%, and 26.20%. The presence of C—N and C—S bonds confirm N and S doping in the graphene. The existence of C—Ni, and C—Co indicates interactions between the Ni—Co-LDH and rGO-NS.

Figure 9:
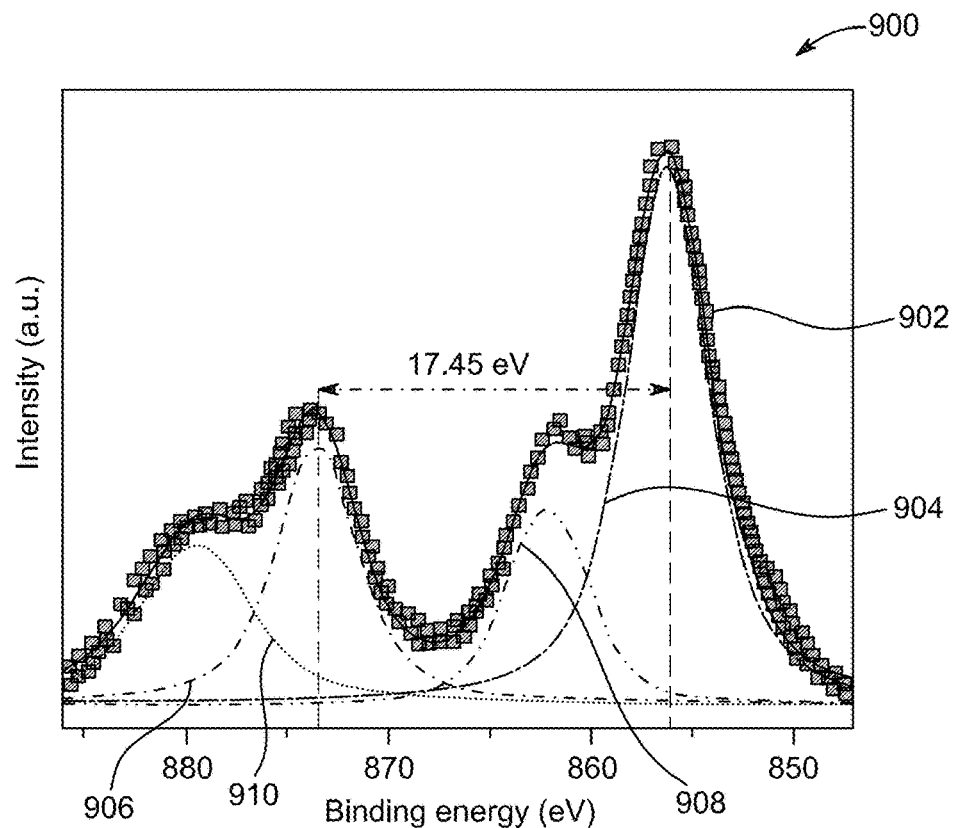
FIG. 9 is a graph representing XPS Ni 2p spectra of the LDH-rGO-NS, according to certain embodiments.

FIG. 9, refers to a graph 900, representing an XPS scan of Ni 2p spectrum. The graph 900 includes a fit line 902, which is deconvoluted into a first trend line 904 referring to Ni $2p_{3/2}$, a second trend line 906 referring to Ni $2p_{1/2}$, a third trend line 908 referring to a shakeup satellite (Sat.) of Ni $2p_{3/2}$, and a fourth trend line referring to a Sat. of Ni $2p_{1/2}$. Peaks at 856.19 and 873.64 eV are associated with $Ni^{2+}$ characteristics of Ni $2p_{3/2}$ and Ni $2p_{1/2}$, respectively. Space between the peaks (☐E) is ~17.45 eV, which is similar to that of the standard spacing between Ni $2p_{3/2}$ and Ni $2p_{1/2}$ of $Ni^{2+}$ state in NiO, thus confirming dominating valence state of $Ni^{2+}$ in the Ni—Co-LDH. Moreover, peaks associated with shakeup satellites (Sat.) of Ni $2p_{3/2}$ and Ni $2p_{1/2}$ are obtained at 862.2 and 879.59 eV, respectively.

Figure 10:
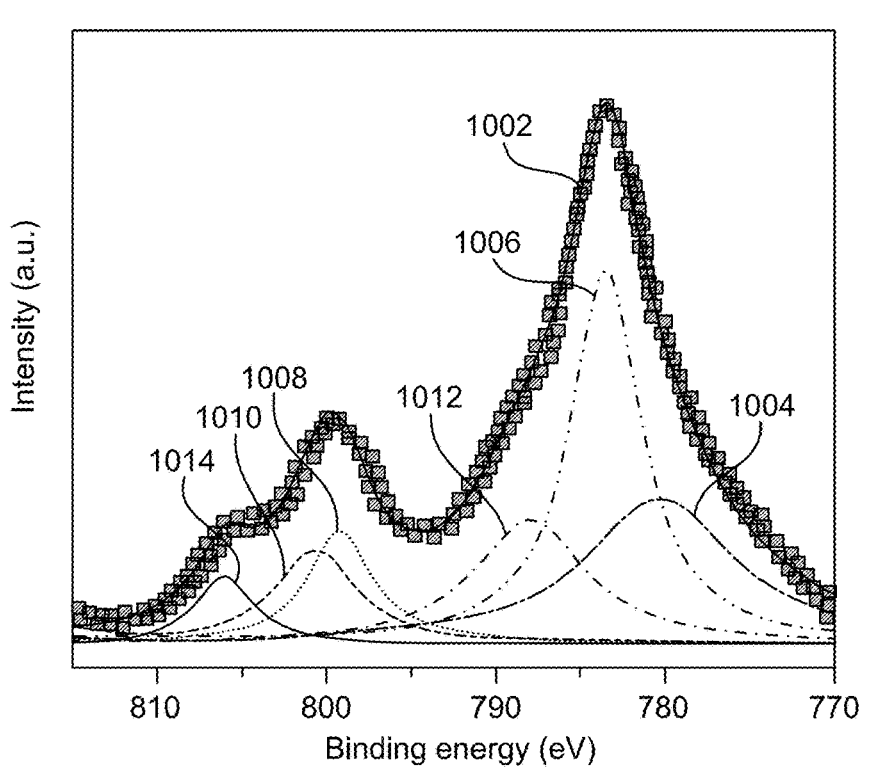
FIG. 10 is a graph representing XPS Co 2p, spectra of the LDH-rGO-NS, according to certain embodiments.

FIG. 10 refers to a graph 1000, representing an XPS scan of Co 2p spectrum. The graph 1000 includes a fit line 1002 which is deconvoluted into a first trend line 1004 referring to $Co^{3+}$ $2p_{3/2}$, a second trend line 1006 referring to $Co^{2+}$ $2p_{3/2}$, a third trend line 1008 referring to $Co^{3+}$ $2p_{1/2}$, a fourth trend line 1010 referring to $Co^{2+}$ $2p_{1/2}$, a fifth trend line 1012 referring to Sat. of Co $2p_{3/2}$, a sixth trend line 1014 referring to Sat. of Co $2p_{1/2}$. Peaks corresponding to the first and second trend lines 1004, 1006 are located at 780.46 and 783.41 eV, respectively. Similarly, peaks corresponding to the third and fourth 1008, 1010 are located at 799.23 and 800.89 eV, respectively. Moreover, peaks corresponding to the fifth and sixth trend lines 1012, 1014 are obtained at 785.62 and 803.15 eV, respectively. A low-intensity peak corresponding to Co $2p_{3/2}$ demonstrates the existence of both $Co^{3+}$ and $Co^{2+}$ in the LDH-rGO-NS. However, the spacing between Co $2p_{3/2}$ and Co $2p_{1/2}$ is 16.42 eV indicating that the dominant valence state is $Co^{2+}$.

FIG. 11 refers to a graph 1100, representing XPS S 2p spectra of the LDH-rGO-NS. The graph 1100 includes a fit line 1102 which is deconvoluted into a first trend line 1104 referring to S $2p_{3/2}$, a second trend line 1106 referring to S $2p_{1/2}$, third and fourth trend lines 1108, 1110 referring to oxidized-S. Peaks corresponding to the first and second trend lines 1104, 1106 (S $2p_{3/2}$ and S $2p_{1/2}$) are located at 161.71 and 163.49 eV, respectively. The spacing between the peaks is 1.78 eV, which is larger than pristine S. Moreover, peaks associated with the third and fourth trend lines 1108, 1110 (oxidized-S) of lower intensity are observed at 166.9 and 170.2 eV.

FIG. 12 refers to a graph 1200, representing XPS N is spectra of the LDH-rGO-NS. The graph 1200 includes a fit line 1202 which is deconvoluted into a first trend line 1204 referring to pyridinic-N, a second trend line 1206 referring to pyrrolic-N, a third trend line 1208 referring to graphitic-N and a fourth trend line 1210 referring to oxidized-N. Peaks corresponding to the first, second, third, fourth trend lines 1204, 1206, 1208, 1210 are located at 398.01, 399.72, 401.89, and 403.21 eV, respectively. Corresponding percentage of N moieties is 14.48%, 20.79%, 40.25%, and 24.48%, respectively. The graphitic-N has a maximum fraction, which can act as a strong electron-donating group to an aromatic π-system.

Electrochemical Properties

Figure 13:
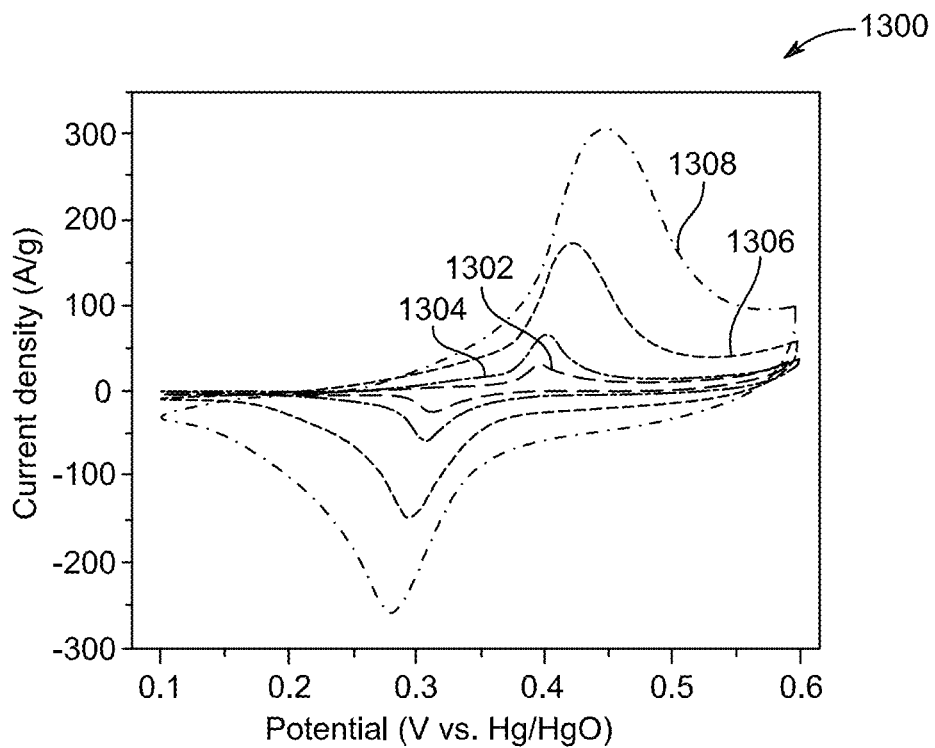
FIG. 13 is a graph representing cyclic voltammetry (CV) curves of an LDG-rGO-NS electrode at various sweep rates, according to certain embodiments.
Figure 14:
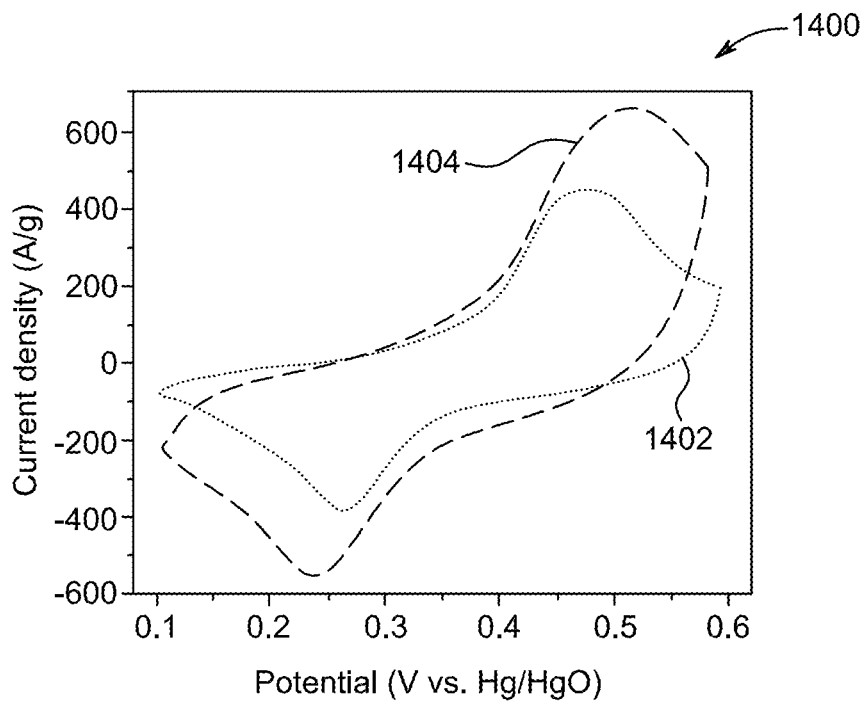
FIG. 14 is a graph representing CV curves of the LDH-rGO-NS electrode at various scan rates, according to certain embodiments.

The electrochemical performance of electrode materials is assessed using EIS, CV, and GCD. FIG. 13 refers to a graph 1300, including a first curve 1302 referring to a CV curve of an LDG-rGO-NS electrode at v value of 2 $mVs^{-1}$, a second curve 1304 referring to a CV curve of the LDG-rGO-NS electrode at 5 $mVs^{-1}$, a third curve 1306 referring to a CV curve of the LDG-rGO-NS electrode at 20 $mVs^{-1}$, and a fourth curve 1308 referring to a CV curve of the LDG-rGO-NS electrode at 50 $mVs^{-1}$. FIG. 14, refers to a graph 1400, representing CV curves of the LDH-rGO-NS electrode at various scan rates. The graph 1400 includes a first curve 1402 referring to a CV curve of the LDH-rGO-NS electrode at 100 $mVs^{-1}$ and a second CV curve 1404 referring to a CV curve of the LDH-rGO-NS electrode at 200 $mVs^{-1}$. The CV curves at various v values provide a couple of redox peaks. A pseudo-capacitive behavior of $M(OH)_2/MOOH$ leads to the redox peaks. Alteration of $Ni^{2+}/Ni^{3+}$ and $Co^{2+}/Co^{3+}$ ions adsorbed onto an exterior surface of the Ni—Co-LDH throughout a redox reaction may also lead to the rise of the redox peaks. The redox peaks may be raised by the reactions given by equations (1) and (2).

$$Ni(OH)_2 + OH^- \rightarrow NiOOH + H_2O + e^- \quad (1)$$

$$Co(OH)_2 + OH^- \rightarrow CoOOH + H_2O + e^- \quad (2)$$

Figure 15:
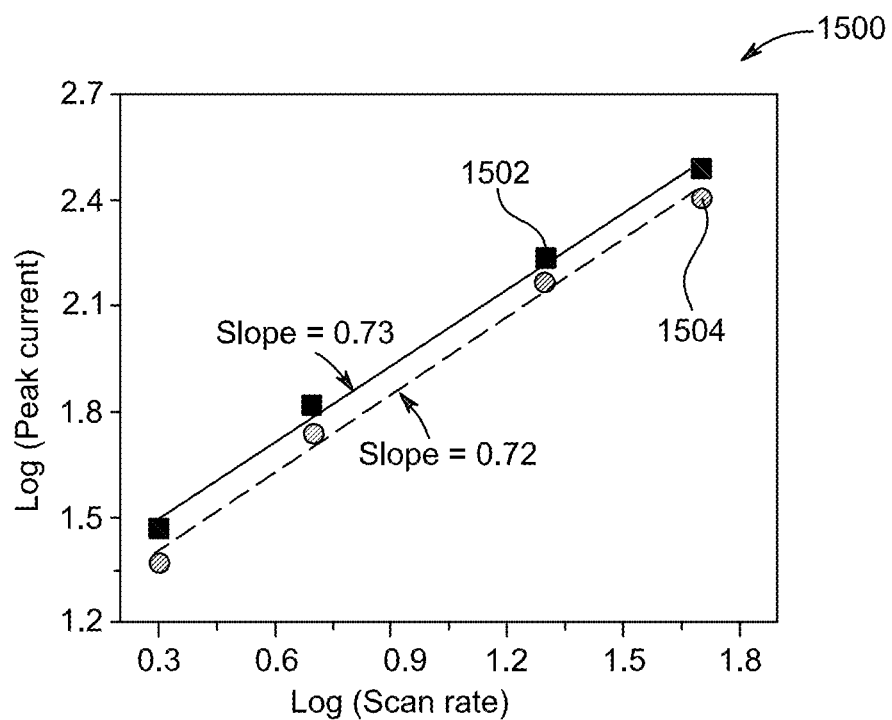
FIG. 15 is a graph representing log (peak current) vs. log (sweep rate), according to certain embodiments.

The effectiveness of charge storing mechanisms is evaluated by determining b-value of a relation (3).

$$i_p = av^b \quad (3)$$

here $i_p$ is the anodic or cathodic current, a is an adjustable parameter, and b-value delivers the perception concerning the charge storing mechanism. The b-value of the cathodic and anodic reactions are calculated using a slope of curve log ($i_p$) vs. log (v) as illustrated in a graph 1500 of FIG. 15. The graph 1500 includes a first trend line 1502 referring to anodic peak current and a second trend line 1504 referring to the cathodic current of the LDH-rGO-NS electrode. The obtained slopes for the anodic and cathodic b-values are 0.73 and 0.72, respectively. The value of the slope of the LDH-rGO-NS reveals a faster ion (charge) transportation rate in the LDH-rGO-NS. Wrapping of Ni—Co-LDH with the rGO-NS leads to an enhancement of a charge transportation rate. The combined impact of conductivity and heteroatoms (N and S) caused an improvement in the charge transportation rate.

Spacing between anodic and cathodic peaks increases with rise in v value. However, the appearance of the curves is unchanged. Specific capacitances at various v are determined by relation (4).

$$C_s = \frac{\int_{V_1}^{V_2} Idt}{2vm(V_2 - V_1)} \quad (4)$$

Figure 16:
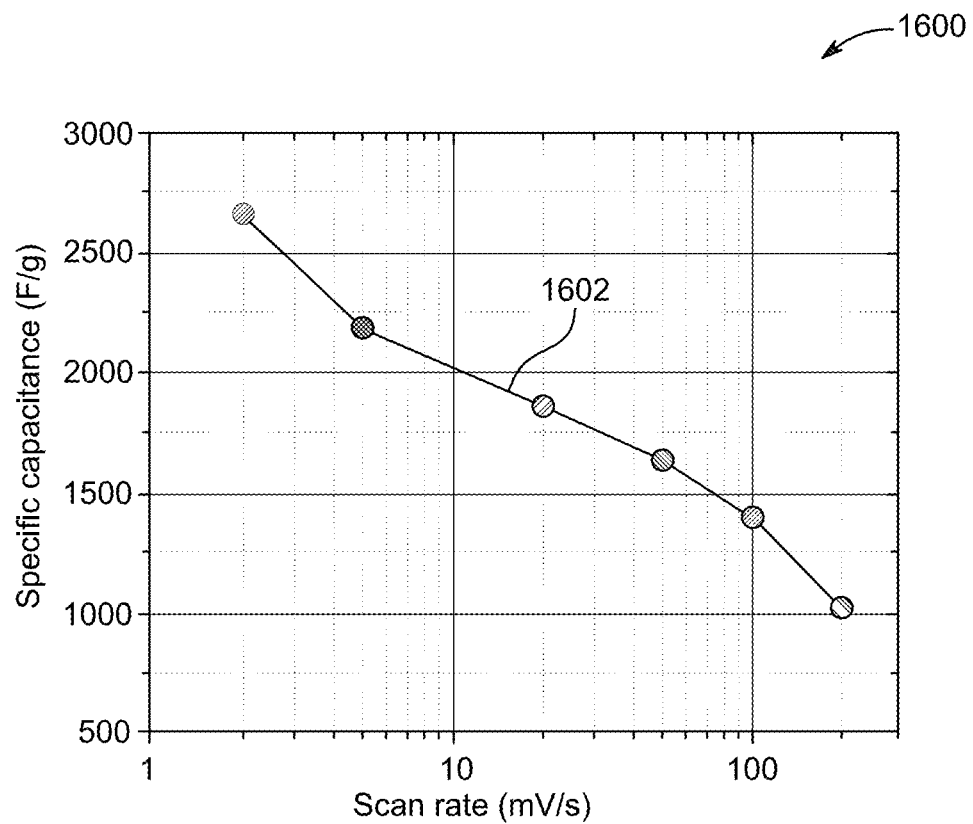
FIG. 16 is a graph representing specific capacity as a function of sweep rate, according to certain embodiments.
Figure 17:
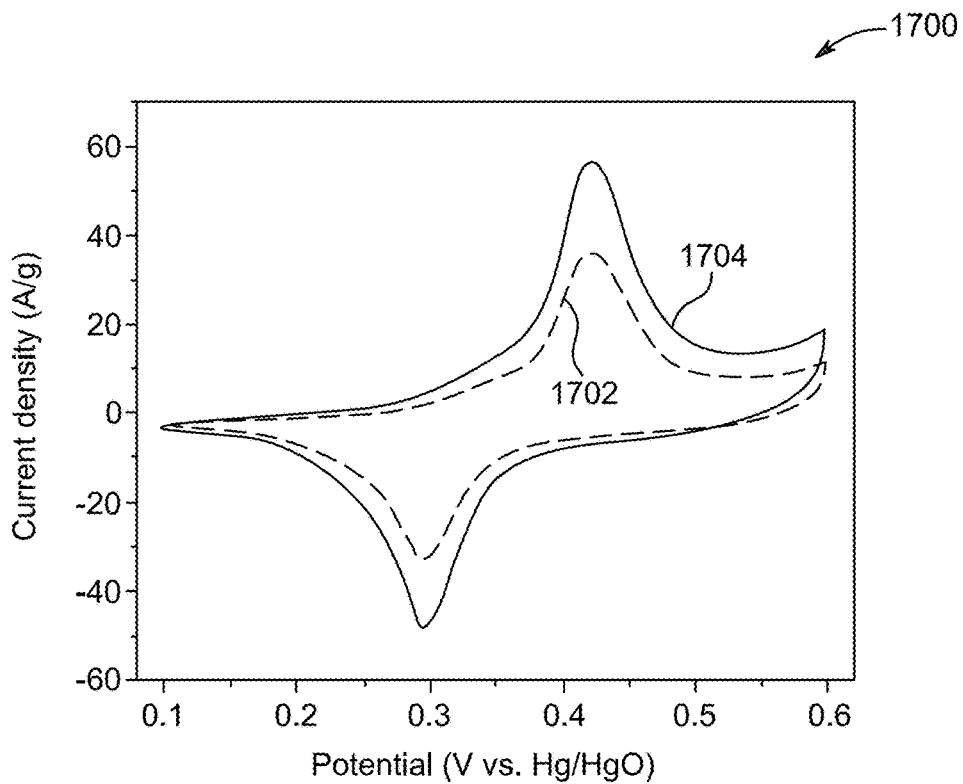
FIG. 17 is a CV of a Ni—Co-LDH electrode and the LDH-rGO-NS electrode at the scan rate of 20 mV/s, according to certain embodiments.
Figure 18:
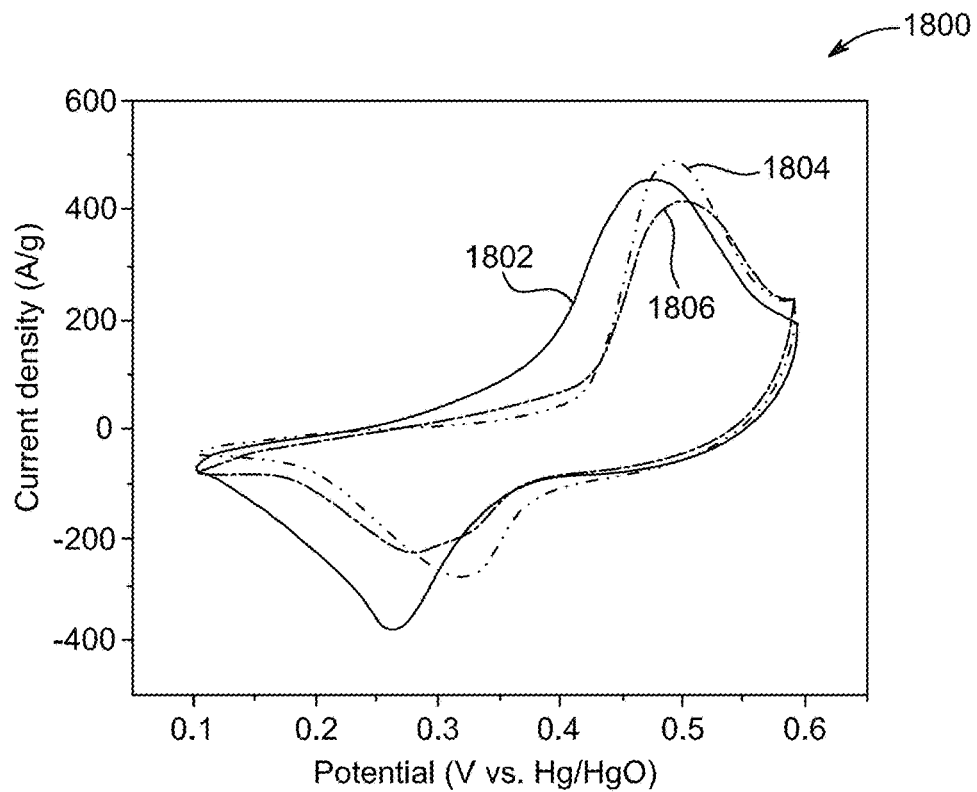
FIG. 18 is a graph representing CV curves of the LDH-rGO-NS electrode for various cycles at a scan rate of 100 mV/s, according to certain embodiments.

The obtained values of $C_s$ are 2651, 2178, 1853, 1633, 1388, and 1016 $F \cdot g^{-1}$ at v=2, 5, 20, 50, 100, and 200 $mVs^{-1}$, respectively. The $C_s$ value at a v=20 $mVs^{-1}$ is 70% of the $C_s$ value obtained at 2 $mVs^{-1}$ as shown by a trend line 1602 of graph 1600 of FIG. 16. However, referring to FIG. 17, a graph 1700 refers to CV curves of a Ni—Co-LDH electrode and the LDH-rGO-NS electrode at the scan rate of 20 mV/s. The graph 1700 includes a first curve 1702 referring to a CV curve of the Ni—Co-LDH electrode and a second curve 1704 referring to a CV curve of the LDH-rGO-NS electrode. The capacity of the first curve 1702 is obtained as 1226 $Fg^{-1}$, which is lower than the second curve 1704. The stability of the electrode materials was tested using a long-cycled CV measurement. A first curve 1802 refers to a CV curve of 1st cycle at v=100 $mVs^{-1}$, a second curve 1804 refers to a CV curve of 1000th cycle at v=100 $mVs^{-1}$ and a third curve 1806 refers to a CV curve of 2000th cycles at a v=100 $mVs^{-1}$ as shown in a graph 1800 of FIG. 18. The obtained results reveal that a retention rate is 71% at the v=100 $mVs^{-1}$ after 2000th cycles.

Figure 19A:
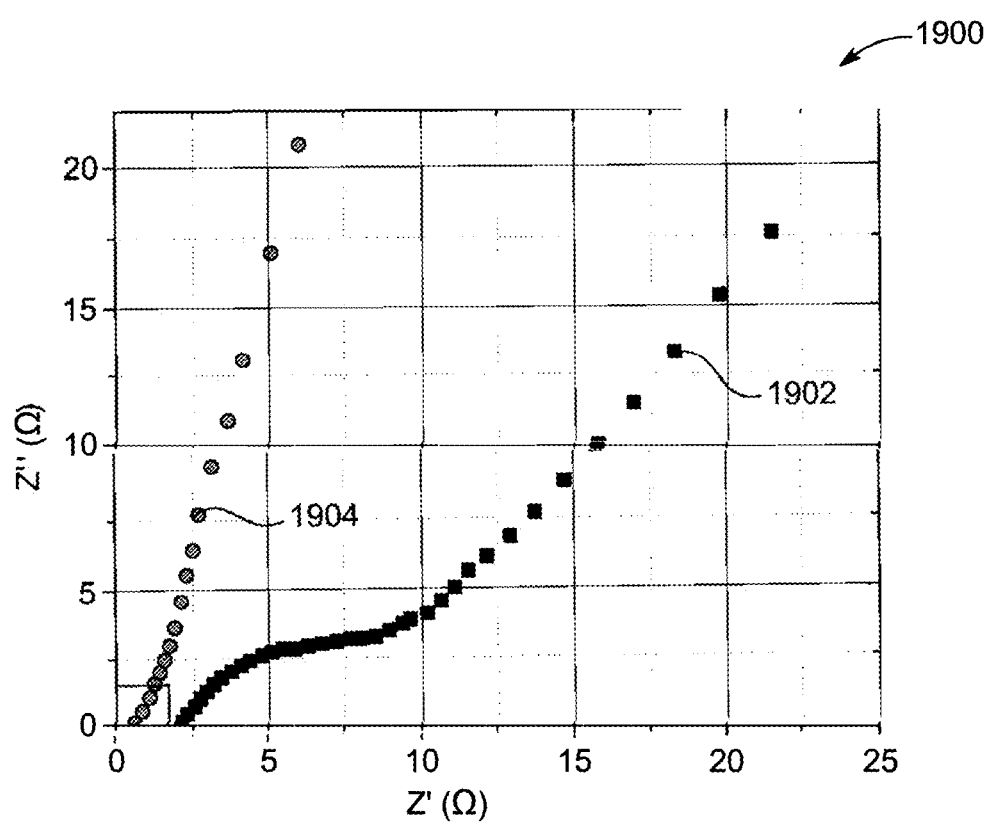
FIG. 19A is a graph representing an electrochemical impedance spectroscopy (EIS) of the Ni—Co-LDH and LDH-rGO-NS electrodes, according to certain embodiments.

FIG. 19A refers to a Nyquist plot 1900 of the Ni—Co-LDH and LDHrGO-NS electrodes. Ion/charge transportation was investigated using EIS measurement. The Nyquist plot 1900 includes a first trend line 1902 referring to the Ni—Co-LDH electrode and a second trend line 1904 referring to the LDHrGO-NS electrode. The first and second trend lines 1902, 1904 with a circuit shown in FIG. 19B reveal the value of series resistance ($R_s$) and a charge transfer resistance ($R_{ct}$). Generally, a Nyquist plot includes a semicircle fragment that is obtained in a mid-high frequency section and a lined shape fragment that is formed in a low-frequency region.

Figure 19B:
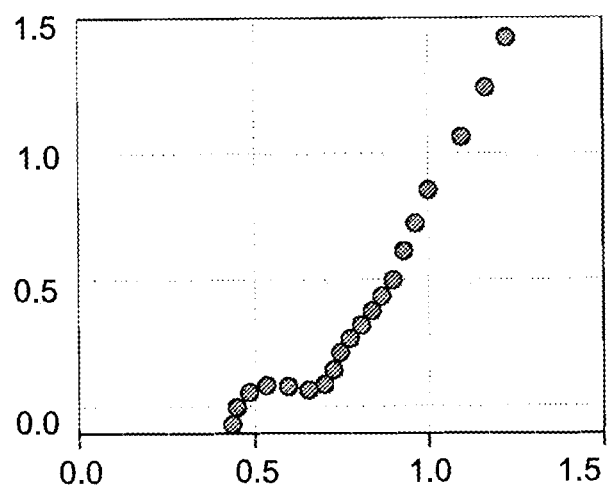
FIG. 19B is a magnified portion of the graph of FIG. 19A, according to certain embodiments.

FIG. 19B is a magnified portion of the Nyquist plot 1900. The magnified portion represents $R_s$ and $R_{ct}$ values for the LDH-rGO-NS electrode in a range of 1.5Ω. The obtained values of $R_s$ and $R_{ct}$ for the LDH-rGO-NS electrode are found to be 0.43 and 0.24Ω, respectively. The $R_s$ value of the LDH-rGO-NS is higher than a Ni—Co-LDH composite with a N-doped rGO (LDH-rGO-N) with 0.31Ω. However, the $R_s$ value of the LDH-rGO-NS is lower than a composite Ni—Co-LDH and rGO (Ni—Co-LDH/rGO) with 1.099Ω. Hence, the above values confirm that the LDH-rGO-NS offers good conductivity. Moreover, the obtained value of $R_{ct}$ of the LDH-rGO-NS is 0.24Ω, which is similar to LDH/rGO with 0.22Ω. However, the obtained $R_s$ and $R_{ct}$ values for the Ni—Co-LDH are 2.15 and 7.83Ω, respectively (FIG. 19A).

Figure 20:
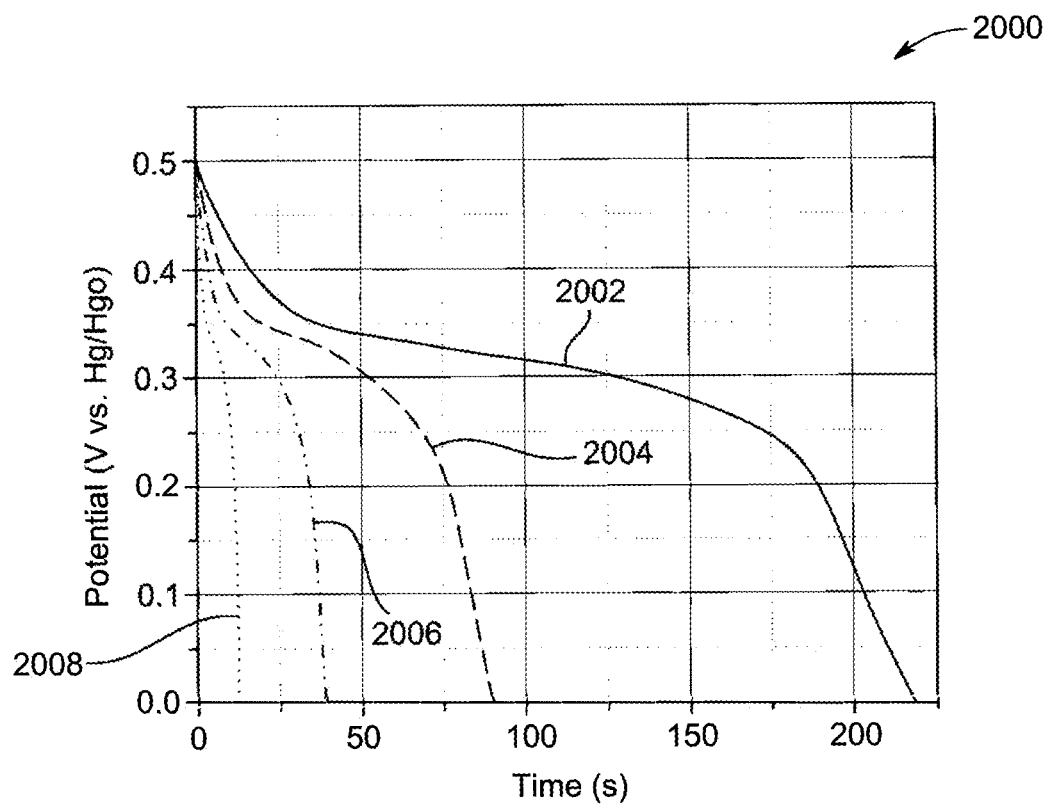
FIG. 20 is a graph representing discharge characteristics of the LDH-rGO-NS electrode, according to certain embodiments.
Figure 21:
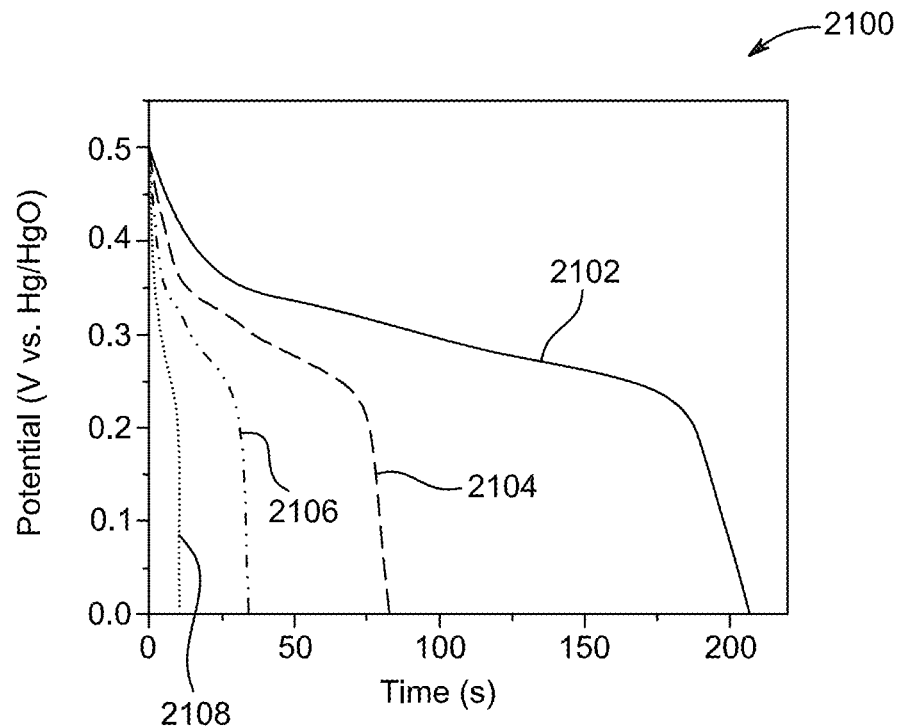
FIG. 21 is a graph representing potential as a function of time of an LDH-rGO electrode, according to certain embodiments.

GCD characterization is used for an additional assessment of the electrochemical performance of the LDH-rGO-NS electrode. FIG. 20 refers to a graph 2000, representing discharge characteristics of the LDH-rGO-NS electrode. The graph 2000 includes a first curve 2002 referring to a galvanometric discharge curve at a discharge current density of 5 $Ag^{-1}$, a second curve 2004 referring to a galvanometric discharge curve at a discharge current density of 10 $Ag^{-1}$, a third curve 2006 referring to a galvanometric discharge curve at a discharge current density of 20 $Ag^{-1}$, and a fourth curve 2008 referring to a galvanometric discharge curve at a discharge current density of 50 $Ag^{-1}$. However, comparative discharge characteristics of an LDH-rGO electrode are shown in graph 2100 of FIG. 21. The graph 2100 includes a first curve 2102 referring to a galvanometric discharge curve at the discharge current density of 5 $Ag^{-1}$, a second curve 2104 referring to a galvanometric discharge curve at the discharge current density of 10 $Ag^{-1}$, a third curve 2106 referring to a galvanometric discharge curve at the discharge current density of 20 $Ag^{-1}$, and a fourth curve 2108 referring to a galvanometric discharge curve at the discharge current density of 50 $Ag^{-1}$. The galvanometric discharge curves were used to determine a specific discharge capacitance ($C_{ds}$) at various discharge current (I) using relation (5).

$$C_{ds} = \frac{I\Delta t}{m(\Delta V)} \qquad (5)$$

here, $\Delta t$ is the discharge time (s) and $\Delta V$ is the potential drop.

The obtained $C_{ds}$ values of the LDH-rGO-NS electrode are 2193, 1806, 1556, and 1290 $Fg^{-1}$ at the discharge current density of 5, 10, 20, and 50 $Ag^{-1}$, respectively. However, the $C_{ds}$ values of the LDH-rGO electrode are obtained at 5, 10, 20, and 50 $Ag^{-1}$ are 2050, 1646, 1352, and 1060 $Fg^{-1}$, respectively.

Figure 22:
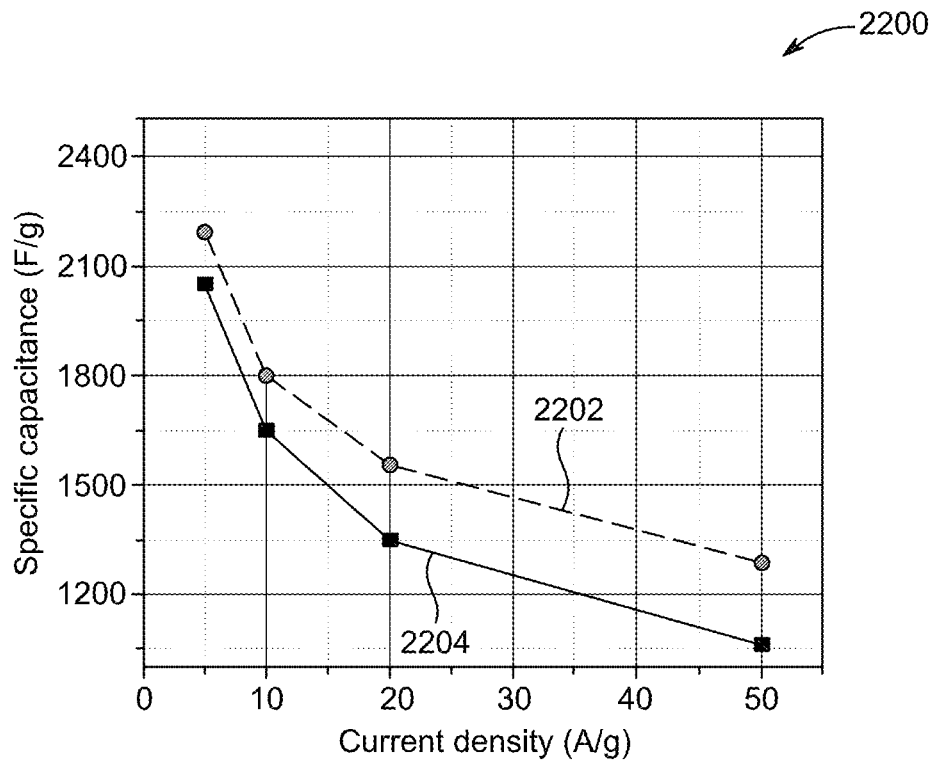
FIG. 22 is a graph representing the specific capacitance as a function of the discharge current density of the LDH-rGO-NS and LDH-rGO electrodes, according to certain embodiments.

FIG. 22, refers to a graph 2200, representing the dependency of the $C_{ds}$ on the discharge current density of the LDH-rGO-NS and LDH-rGO electrodes. The graph 2200 refers to a first trend line 2202 referring to the LDH-rGO-NS electrode and a second trend line 2204 referring to the LDH-rGO electrode. The values of $C_{ds}$ of the LDH-rGO-NS electrode are higher than the values of the LDH-rGO electrode. N and S co-doping leads to an excellent ion/charge transfer rate which further leads to enhanced electrochemical performance of the LDH-rGO-NS electrode.

The LDH-rGO-NS is an efficient electrode material for high-performance electrochemical energy storage devices. The graphene possesses high electrical and thermal conductivity, high mechanical strength, and a high specific surface area. Incorporation of heteroatoms such as N, S, P, B into the rGO increase the electrochemical properties of the LDH composite. Ni—Co-based LDHs (Ni—Co-LDH) showed superior specific capacitance, good synergy, and high-rate capability. Further, the electrode is prepared by wrapping the Ni—Co-LDH with the N and S-co-doped rGO (LDH-rGO-NS) via a simple hydrothermal process. The electrodes including the LDH composite provide great performance, prolonged life cycle, tremendous cyclic stability, and ecological friendliness.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A layered dual hydroxide (LDH) composite comprising:
   a nickel (Ni)-cobalt (Co)-LDH; and
   nitrogen (N) and sulfur (S) co-doped reduced graphene oxide (rGO-NS);
   wherein the Ni—Co-LDH is at least partially enfolded by the rGO-NS to form the LDH composite,
   wherein the LDH composite has a surface area of 100-150 square centimeter per gram ($cm^2/g$).

2. The LDH composite of claim 1, wherein the rGO-NS has:
   a layered sheet structure with 3-10 layers spaced 3.7-5 angstrom (Å) apart;
   wherein the N and S are covalently bound to carbon in the structure.

3. The LDH composite of claim 1, wherein the Ni—Co-LDH has:
   a plate structure with a length and a width less than 5 micrometer (μm), and a thickness less than 20 nanometer (nm).

4. The LDH composite of claim 1, wherein:
   the Ni—Co-LDH is positively charged, and the rGO-NS is negatively charged; and
   the Ni—Co-LDH and the rGO-NS at least partially interact through electrostatic interactions.

5. The LDH composite of claim 1, wherein:
   the elements C, Ni, Co, O, S, and N are homogeneously distributed.

6. The LDH composite of claim 1, wherein:
   the Ni—Co-LDH and the rGO-NS at least partially interact through C-M bonds wherein M is Ni or Co.

7. An electrode comprising the LDH composite of claim 1, wherein the electrode comprises:
   a first substrate;
   at least one binding compound; and
   at least one conductive additive;
   wherein a mixture of 5-15 wt. % of the binding compound, 5-15 wt. % of the conductive additive, and 70-90 wt. % of the LDH composite based on the total weight of the binding compound, conductive additive, and LDH composite, at least partially coats a first side of the first substrate.

8. The electrode of claim 7, wherein:
   the binding compound is at least one selected from a group consisting of polyvinylidene fluoride (PVDF) and N-methylpyrrolidone (NMP).

9. The electrode of claim 7, wherein:
   the conductive additive is at least one selected from a group consisting of graphite, activated carbon (AC), reduced graphene oxide (rGO), carbon nanotubes (CNTs), carbon nanofibers (CNFs), and carbon black.

10. The electrode of claim 7, wherein:
the first substrate is formed from at least one material selected from a group consisting of copper, aluminum, nickel, iron, and steel.

11. The electrode of claim 7, having:
a charge transfer resistance of 0.2-0.4 Ohms ($\Omega$).

12. The electrode of claim 7, having:
a specific capacitance (Cs) of 1,100-2,300 Farad per gram (F/g) at a discharge current density of 5-50 ampere per gram (A/g).

13. The electrode of claim 12, wherein:
at least 70% of the initial capacitance is maintained up to 2000 cycles.

14. A layered dual hydroxide (LDH) composite comprising:
a nickel (Ni)-cobalt (Co)-LDH; and
nitrogen (N) and sulfur (S) co-doped reduced graphene oxide (rGO-NS);
wherein the Ni—Co-LDH is at least partially enfolded by the rGO-NS to form the LDH composite,
wherein the Ni—Co-LDH has a formula of AcB Z AdB; wherein c is Co, wherein the Co is 90-95% $Co^{2+}$ and 5-10% $Co^{3+}$, d is Ni, wherein the Ni is $Ni^{2+}$, A and B are layers of hydroxide ($HO^-$) anions, and Z are layers of water molecules.

* * * * *